US008823203B2

(12) United States Patent
Tani

(10) Patent No.: US 8,823,203 B2
(45) Date of Patent: Sep. 2, 2014

(54) CONTROLLER FOR ENGINE

(75) Inventor: Keisuke Tani, Anjo (JP)

(73) Assignee: Denso Corporation, Kariya (JP)

( * ) Notice: Subject to any disclaimer, the term of this patent is extended or adjusted under 35 U.S.C. 154(b) by 966 days.

(21) Appl. No.: 12/943,096

(22) Filed: Nov. 10, 2010

(65) Prior Publication Data

US 2011/0109157 A1    May 12, 2011

(30) Foreign Application Priority Data

Nov. 12, 2009  (JP) .................................. 2009-259012
Mar. 26, 2010  (JP) .................................. 2010-72922
Mar. 26, 2010  (JP) .................................. 2010-72923

(51) Int. Cl.
*B60H 1/00*  (2006.01)
*F02D 41/40* (2006.01)
*F02G 5/00*  (2006.01)
*F02D 41/08* (2006.01)

(52) U.S. Cl.
CPC ................. *F02D 41/40* (2013.01); *Y02T 10/44* (2013.01); *B60H 1/00438* (2013.01); *F02G 5/00* (2013.01); *F02D 41/086* (2013.01); *B60H 1/00735* (2013.01); *F02D 2200/0414* (2013.01); *B60H 1/00007* (2013.01); *F02D 2200/021* (2013.01); *Y02T 10/166* (2013.01)
USPC .............................. 307/9.1; 307/10.1; 307/31

(58) Field of Classification Search
USPC .......................................... 307/9.1, 10.1, 31
See application file for complete search history.

(56) References Cited

U.S. PATENT DOCUMENTS

| 4,502,454 A | 3/1985 | Hamai et al. |
| 2006/0122737 A1 | 6/2006 | Tani et al. |
| 2008/0011005 A1 | 1/2008 | Obayashi et al. |

FOREIGN PATENT DOCUMENTS

| JP | 58-97943 | 7/1983 |
| JP | S60-51420 A | 3/1985 |
| JP | 61-186766 | 11/1986 |
| JP | 6-14464 | 1/1994 |
| JP | 11-324746 | 11/1999 |
| JP | P2001-241736 A | 9/2001 |
| JP | P2002-036903 A | 2/2002 |
| JP | 3704788 | 8/2005 |
| JP | P2005-257097 A | 9/2005 |
| JP | 2007-100687 | 4/2007 |
| JP | P2010-023633 A | 2/2010 |

OTHER PUBLICATIONS

Japanese Office Action dated Jan. 17, 2012, issued in corresponding Japanese Application No. 2010-072922 with English Translation.
Japanese Office Action dated Apr. 3, 2012, issued in corresponding Japanese Application No. 2010-072923 with English Translation.

*Primary Examiner* — Hal Kaplan
(74) *Attorney, Agent, or Firm* — Nixon & Vanderhye PC

(57) ABSTRACT

A waste heat controller controls waste heat quantity of an engine according to a required heat quantity along with a heat-utilize requirement. When the heat-utilize requirement is generated, a fuel-increase-rate indicating a fuel increase quantity is computed. A reference fuel-increase-rate is established to be compared with the fuel-increase-rate. Based on this comparison result, it is determined whether the waste heat increase control will be executed.

36 Claims, 21 Drawing Sheets

CONTROLLER FOR ENGINE

CROSS-REFERENCE TO RELATED APPLICATION

This application is based on Japanese Patent Applications No. 2009-259012 filed on Nov. 12, 2009, No. 2010-72922 filed on Mar. 26, 2010, and No. 2010-72923 filed on Mar. 26, 2010, the disclosures of which are incorporated herein by reference.

FIELD OF THE INVENTION

The present invention relates to controller for an internal combustion engine. Especially, the present invention relates to a waste heat controller which controls waste heat quantity of an engine in accordance with a heat-utilize requirement. Also, the present invention relates to a heat-source controller which controls a heat-supply from a heat source of a vehicle. Further, the present invention relates to an electric-power-source controller which controls an electric-power-supply from an electric-power source of a vehicle.

BACKGROUND OF THE INVENTION

In an internal combustion engine for a vehicle, the combustion energy includes kinetic energy and heat energy. This heat energy is utilized for controlling a temperature in a vehicle interior. Engine waste heat is used to warm the air of the vehicle interior.

JP-U-61-186766A and JP-11-324746A describe an ignition timing of a spark plug and valve timings of intake/exhaust valves are controlled to increase the engine waste heat quantity.

When increasing the engine waste heat quantity based on the heat-utility requirement, a fuel consumption depends on an engine driving condition. However, in the apparatus disclosed in the above patent documents, the ignition timing and the valve timings are controlled without respect to the engine driving condition. Thus, it may excessively increase the fuel consumption and may cause a deterioration in fuel economy.

In order to improve fuel economy, a hybrid vehicle and an idle reduction control system have been developed.

Generally a waste heat of an engine is utilized for heating an interior of a vehicle through engine coolant. However, if the engine waste heat runs shortage, it is likely that enough heat quantity is not ensured for heating the interior of the vehicle.

Japanese Patent No. 3704788 shows a heating system which includes a heating device utilizing the engine waste heat and a heat pump device driven by an electric motor.

This heating system is provided with a plurality of heat sources which are used for heating the interior of the vehicle. However, the above Japanese patent does not show how much energy is used from which heat source in view of effective utilization of heat energy.

JP-2006-166639A (US-2006-122737A1) shows an electric-power-source controller computing a fuel quantity which each electric-power source consumes for generating a unit electric-power. This fuel quantity is referred to as an electricity-fuel rate. The controller determines a combination of the electric-power source in such a manner that the electricity-fuel rate becomes a minimum value. The electric-power source includes a generator, a battery, and a generator utilizing engine waste heat.

In this control system, the electricity-fuel rate of the generator is varied with respect to a total supplied electric power, and the electricity-fuel rates of the battery and another generator are constant values. Based on the variation in the electricity-fuel rate of the generator, an allocation of electric power of each electric-power source is determined.

However, in a case that the electricity-fuel rates of multiple electric-power sources are varies, it is not always easy to determine the load allocation of each electric-power source in such a manner that the total electricity-fuel rate becomes a minimum value. If all combination of the electric-power sources is computed to determine an optimum allocation, a computation load may be exponentially increased.

SUMMARY OF THE INVENTION

The present invention is made in view of the above matters, and it is an object of the present invention to provide a waste heat controller which is able to control engine waste heat quantity while restricting a deterioration in a fuel economy. Also, it is another object of the present invention to provide a heat-source controller which controls a heat-supply from a heat source of a vehicle while reducing a fuel consumption. Further, it is another object of the present invention to provide an electric-power-source controller which controls an electric-power-supply from multiple electric-power sources of a vehicle while restricting an increase in computation and reducing a fuel consumption for generating the electric-power.

According to the present invention, a waste heat controller controls a waste heat quantity of an engine based on a required heat quantity along with a heat-utilize requirement. The waste heat controller includes an increase rate computing means for computing a fuel-increase-rate in a case that the heat-utilize requirement is generated. The fuel-increase-rate represents a fuel increase quantity relative to a generated waste heat quantity. The controller further includes a reference setting means for setting a reference fuel-increase-rate based on which it is determined whether a waste heat increase control is executed in order to increase an engine waste heat quantity corresponding to the heat-utilize requirement; and a waste heat control means for determining whether the waste heat increase control should be executed based on a comparison result between the fuel-increase-rate and the reference fuel-increase-rate.

Further, according to the present invention, a heat-source controller controls a heat supply from multiple heat sources to a heat exchange portion mounted to a vehicle. The heat-source controller includes: a required heat quantity computing means for computing a required heat quantity which is required to be supplied from the heat sources to the heat exchange portion;

a heat-fuel rate computing means for computing a relationship between a supply heat quantity and a heat-fuel rate representing a fuel consumption for generating a unit heat quantity, with respect to each heat source; and a heat allocation determining means for determining an allocation of heat quantity which each heat source supplies based on the relationship between the supply heat quantity and the heat-fuel rate in such a manner that the total heat quantity agrees with the required heat quantity and that the heat-fuel rate becomes a minimum value.

A required heat quantity is computed, which is required to be supplied to each heat exchanger from multiple heat sources. Further, a relationship between the supply heat quantity and the heat-fuel rate is computed with respect to each heat source.

An allocation of heat quantity which each heat source supplies is determined based on the relationship between the supply heat quantity and the heat-fuel rate in such a manner that the total heat quantity agrees with the required heat quantity and that the heat-fuel rate becomes a minimum value. Thus, the required heat quantity can be supplied to the heat exchanging portions from the multiple heat sources while the fuel consumption can be restricted as much as possible.

Further, according to the present invention, an electric-power-source controller controls an electric-power supply from multiple electric-power sources to an electric load mounted to a vehicle. The electric-power-source controller comprising: a required electric power computing means for computing a required electric power which is required to be supplied from the multiple electric-power sources to the electric load; an electricity-fuel computing means for computing a fuel consumption per increased electric-power with respect to each electric power source; and an electric-power allocation determining means for determining an allocation of electric-power which each electric-power source supplies in such a manner that the total electric-power agrees with the required electric-power and the fuel consumption per increased electric-power of each electric-power source agree with each other.

It should be noted that the fuel consumption per increased electric-power represents a fuel consumption in a case that the electric-power supplied from the electric-power source is slightly increased.

A required electric-power is computed, which is required to be supplied to each electric load from multiple electric-power sources. An allocation of electric-power of each electric-power source is determined as follows, whereby the total fuel consumption can be made minimum.

For example, in a case that electric-power is supplied to an electric load from a first electric-power source and the second electric-power source, it is assumed that the fuel consumption per increased electric-power of the first and the second electric-power source is 200 g/kWh and 210 g/kWh respectively. Further, it is assumed that the electric-power supplied from the first electric-power source is increased by 1 kW and the electric-power supplied from the second electric-power source is decreased by 1 kW. Consequently, although a total of the electric-power supplied from the first and the second electric-power source does not change, the fuel quantity consumed by the first and the second electric-power source is reduced by 10 g/h.

That is, in a case that the fuel consumption per increased electric-power has a difference between multiple electric-power sources, the fuel consumption can be reduced without varying the total electric-power supplied from the electric-power sources. In other words, when the fuel consumption per increased electric-power of each electric-power source agrees with each other, the fuel consumption can not be decreased any more. Thus, the allocation of electric-power of each source is determined in such a manner as to establish such a situation, whereby the total fuel consumption can be made minimum.

The allocation of electric-power which each electric-power source supplies is determined in such a manner that the total electric-power agrees with a required electric power and the fuel consumptions per increased electric-power of each electric power source agrees with each other. Thus, the required electric-power can be supplied to the electric loads from the multiple electric-power sources while the fuel consumption can be restricted as much as possible. Furthermore, an increase in computing load can be restricted.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
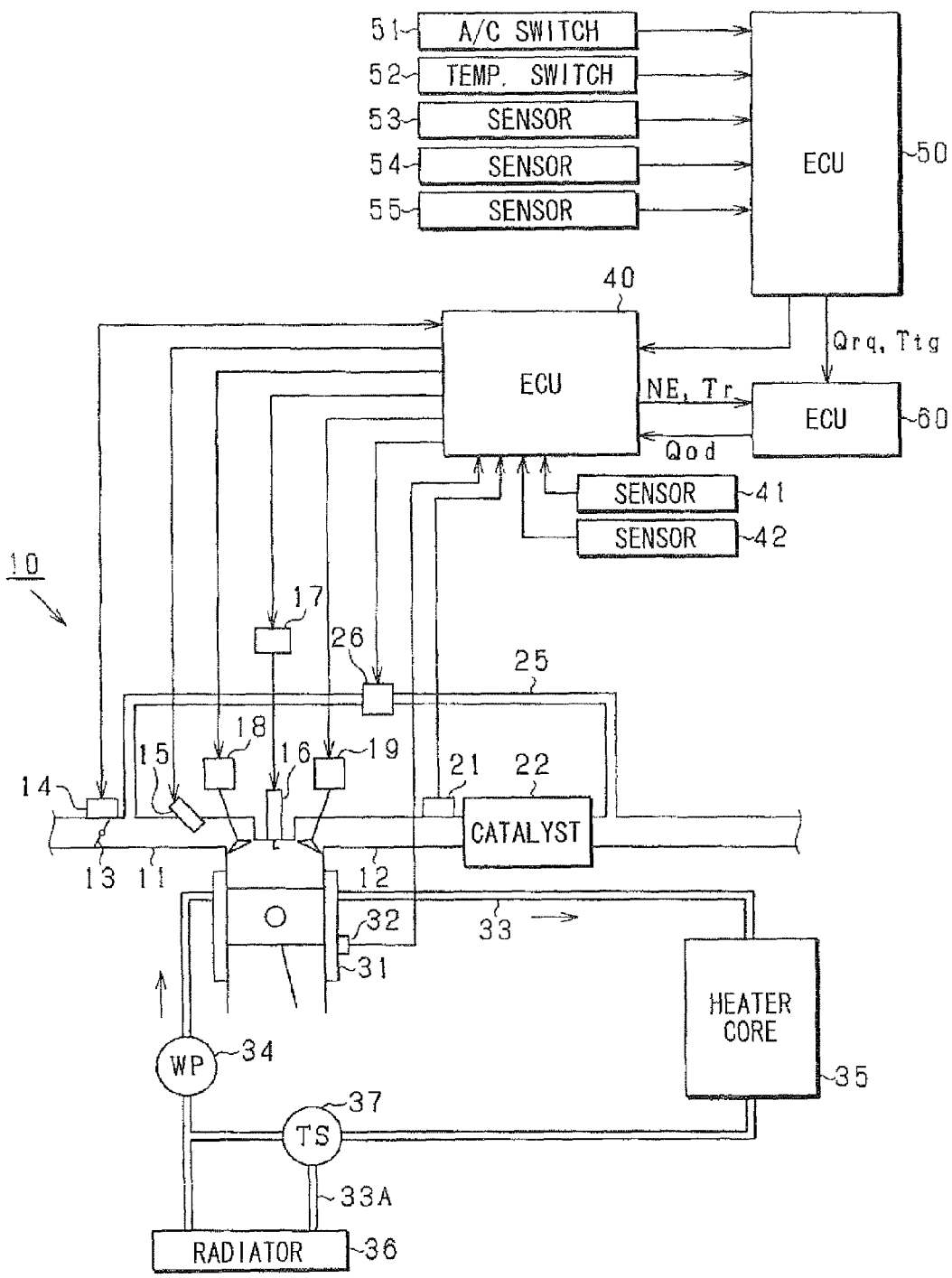
FIG. 1 is a schematic block diagram showing an engine waste heat control system.

FIG. 1 is a schematic view of a waste heat control system (waste hear reuse system) according to an embodiment.

An engine 10 is provided with an intake pipe 11 and an exhaust pipe 12. A throttle valve 13 is provided in the intake pipe 11. The throttle valve 13 is driven by an electric throttle actuator 14, such as an electric motor. The throttle actuator 14 is provided with a throttle position sensor (not shown) which detects a throttle position.

The engine 10 is provided with a fuel injector 15, an igniter 17, a spark plug 16, an intake valve timing controller 18 and an exhaust valve timing controller 19.

The intake valve timing controller 18 advances or retards a valve timing of an intake valve, and the exhaust valve timing controller 19 advances or retards a valve timing of an exhaust valve.

An oxygen concentration sensor 21 detecting an oxygen concentration in exhaust gas is provided to the exhaust pipe 12. A three-way catalyst 22 which purifies the exhaust gas is provided downstream of the oxygen concentration sensor 21.

The engine 10 is provided with an exhaust gas recirculation system (EGR system) for recirculating a part of exhaust gas into the intake system. An EGR pipe 25 connects the intake pipe 11 and the exhaust pipe 12. The EGR pipe 25 is provided with an electromagnetic EGR valve 26 which adjusts an EGR gas quantity flowing through the EGR pipe 25.

An engine cooling system will be described hereinafter.

An engine coolant flows through a water jacket 31 of the engine 10. A coolant temperature in the water jacket 31 is detected by a coolant temperature sensor 32. An engine coolant pipe 33 is connected to the water jacket 33, and a water pump 34 circulates the coolant in the engine coolant pipe 33.

A heater core 35 is arranged in the engine coolant pipe 33. An air flowing through the heater core 35 receives heat from the eater core 35 to be warmed. The warmed air is introduced into a passenger compartment.

A second coolant pipe 33A is branched from the engine coolant pipe 33. A radiator 36 is arranged in the second coolant pope 33A. A thermostat 37 is provided at a branch point of the second coolant pipe 33A. When the engine coolant temperature is less than a predetermined value, the thermostat 37 closes the second coolant pipe 33A. When the engine coolant temperature is not less than the predetermined value, the thermostat 37 opens the second coolant pipe 33A so that the radiator 36 radiates the heat of the engine coolant.

This control system is provided with an engine electronic control unit (engine-ECU) 40 which executes a various control of the engine 10. The engine-ECU 40 is comprised of a microcomputer including a CPU, a ROM, and a RAM. The ECU 40 executes control programs stored in the ROM to perform various controls according to the engine driving condition. The engine driving condition is detected by an engine speed sensor 41 and engine load sensor 42. The outputs of these sensors 41, 42, the oxygen sensor 21, and the coolant temperature sensor 32 are transmitted to the engine-ECU 40.

Figure 2:
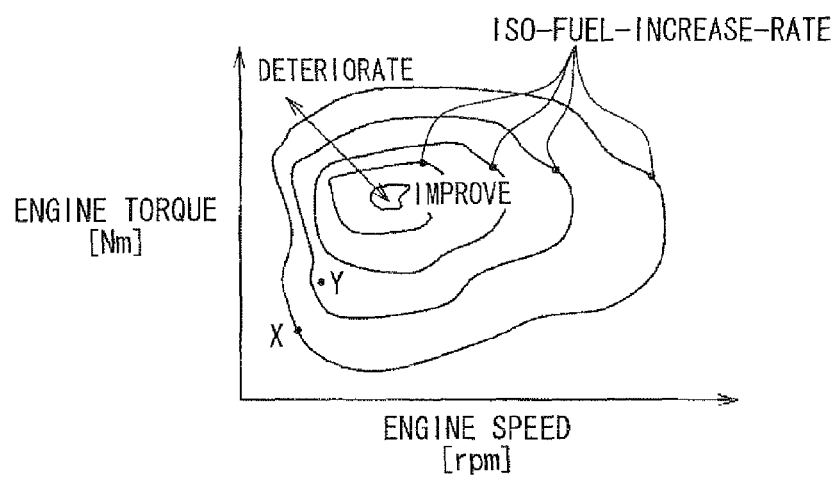
FIG. 2 is a map which shows a relationship between the engine driving condition and a fuel consumption rate.

The engine-ECU 40 executes a fuel injection control, an ignition timing control, a valve timing control, and an intake air control. In each of these controls, an engine shaft efficiency (fuel economy) varies in accordance with the engine driving condition. Each control is executed based on an adapted data so that a maximum efficiency (highest fuel economy) of the engine 10 is obtained. FIG. 2 shows a map which represents a relationship between the engine driving condition and a fuel consumption rate. In FIG. 2, the engine driving condition is represented by an engine speed and an engine torque.

In this control system, the heat energy is recovered from the fuel combustion energy through the engine coolant and is reused.

Specifically, as shown in FIG. 1, this control system is provided with an air-conditioner-ECU 50 and a heat-management-ECU 60. The air-conditioner-ECU 50 and the heat-management-ECU 60 are comprised of a microcomputer including a CPU, a ROM, and a RAM. Each ECU 50, 60 executes control programs stored in the ROM to perform various controls according to the detection signal of the sensors.

Specifically, the air-conditioner-ECU 50 receives signals from an A/C switch 51, a temperature setting switch 52, an internal temperature sensor 53, an exterior temperature sensor 54, and an outlet air temperature sensor 55. Further, the air-conditioner-ECU 50 receives various control signals and data from the engine-ECU 40, and computes a required heat quantity "Qrq". Then, the air-conditioner-ECU 50 transmits the required heat quantity "Qrq" to the heat-management-ECU 60. The heat-management-ECU 60 computes a command heat quantity "Qod" which should be generated by the engine 10 based on the required heat quantity "Qrq". This command heat quantity "Qod" is transmitted to the engine-ECU 40. The engine-ECU 40 controls the engine driving condition based the command heat quantity "Qod". Thereby, the engine 10 generates the waste heat corresponding to the required heat quantity "Qrq".

In this system, when increasing the engine waste heat quantity, a waste-heat-generation control is executed so that the waste heat quantity is increased while the fuel consumption is restricted as much as possible. Specifically, this control system is provided with a plurality of waste-heat-quantity control means for increasing the waste heat quantity. When the heat-utilize requirement is generated, one of the waste-heat-quantity control means is selected, in which a deterioration in fuel economy can be made minimum. Then, the engine waste heat quantity is increased by the selected waste-heat-quantity control means.

The waste-heat-generation control will be described hereinafter. In this control system, at least one of following controls is executed to increase the engine waste heat quantity:

(A) Retarding the ignition timing;
(B) Advancing the opening timing of the intake valve;
(C) Retarding the opening timing of the exhaust valve.

Further, the waste-heat-quantity control means includes followings:

(1) Means for retarding the ignition timing and the exhaust valve opening;
(2) Means for retarding the ignition timing and for advancing the intake valve opening;
(3) Means for retarding the ignition timing.

The engine-ECU 40 selects one of the waste-heat-quantity control means from the above means (1)-(3), in which the command heat quantity "Qod" can be obtained and the fuel consumption is made minimum. By the selected waste-heat-quantity control means, the engine waste heat quantity is increased.

Figure 3:
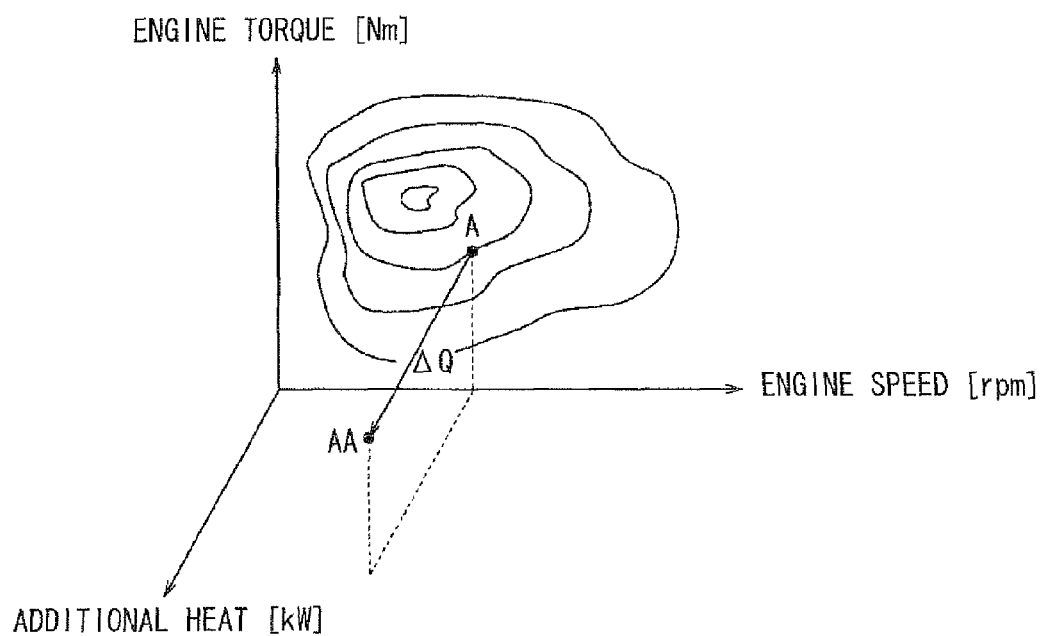
FIG. 3 is a map which shows a relationship between an engine driving condition and an additional heat quantity.

The waste heat control of the engine 10 is executed when a heat-utilize requirement is generated and the current waste heat quantity does not satisfy the required heat quantity "Qrq" at a time of the best fuel economy. The waste heat control is executed to compensate the shortage of the current waste heat quantity. In this case, in order to satisfy the required heat quantity "Qrq", as shown in FIG. 3, it is necessary to move an operation point of the engine 10 from a best fuel economy point "A" to another point "AA" so as to increase the waste heat quantity by a specified heat quantity $\Delta Q$. By moving the operation point of the engine 10 from "A" to "AA", even though the fuel economy is deteriorated from the best fuel economy point, the specified heat quantity (additional heat quantity) $\Delta Q$ is generated to be added to a base waste heat quantity at the best fuel economy point "A".

Figure 4:
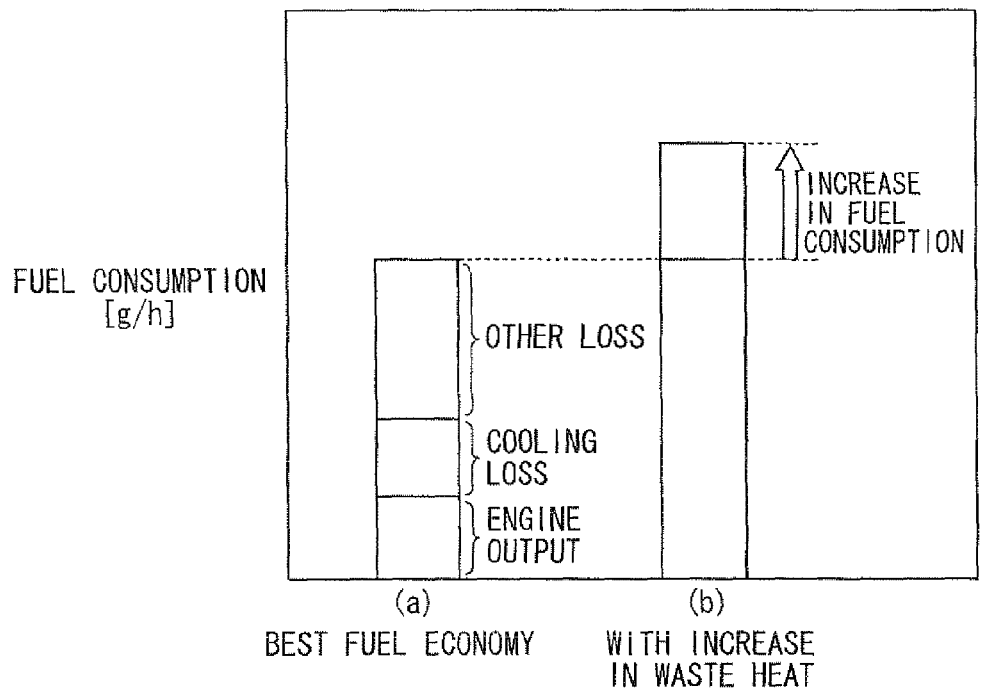
FIG. 4 is a chart for explaining a fuel consumption in a case the additional heat quantity is generated in response to the heat-utilize requirement.

FIG. 4 is a bar chart for explaining a fuel consumption in a case the additional heat quantity is generated in response to the heat-utilize requirement. In FIG. 4, a bar (a) represents a fuel consumption [g/h] in a case that the engine is driven at the best fuel economy point, and a bar (b) represents a fuel consumption [g/h] in a case that the engine waste heat quantity has been increased.

At the best fuel economy point, as shown by the bar (a), about 25% of the fuel combustion energy is converted into an shaft output of the engine 10 as the kinetic energy, about 25% of the fuel consumption energy corresponds to a cooling loss, and the other of the fuel consumption energy correspond to the other loss, such as a loss of auxiliary-machinery or an exhaust loss. The heat energy of the cooling loss is recovered through the engine coolant for warming the interior of vehicle and the like.

When the required heat quantity "Qrq" is increased and the heat energy of the cooling loss does not satisfy the increased "Qrq", the engine waste heat control is performed to generate the additional heat quantity to compensate the shortage of the heat quantity. In this case, it is preferable that an increase in the fuel consumption due to the generation of the additional heat quantity is small as much as possible.

According to the inventor's study, the increase in the fuel consumption depends on an engine operation point driving at a time when the waste heat quantity starts to be increased. For example, if the required heat quantity "Qrq" is not satisfied at a time when the engine is driven at the best fuel economy point, it is necessary to increase the waste heat quantity of the engine 10 to compensate a shortage of the required heat quantity "Qrq". In FIG. 2, an increase in fuel consumption necessary for generating a specified engine waste heat quantity is specific between the engine operation points "X" and "Y" at which the waster heat quantity starts to be increased. That is, a fuel increase quantity (fuel-increase-rate) relative to the engine waste heat quantity depends on the engine operation point at which the waster heat quantity starts to be increased. Further, the fuel-increase-rate also depends on parameters relating to temperature, such an engine coolant temperature and ambient temperature.

The fuel-increase-rate will be described hereinafter. The fuel-increase-rate is a parameter relating to a fuel consumption for increasing the waste heat quantity of the engine 10. Specifically, the fuel-increase-rate is a ratio between the additional heat quantity $\Delta Q$ and an additional fuel quantity $\Delta qf$.

Fuel-increase-rate "$\eta$" [g/kWh]=Additional Fuel Quantity $\Delta qf$ [g/h]/Additional Heat Quantity $\Delta Q$ [kW]

Figure 5:
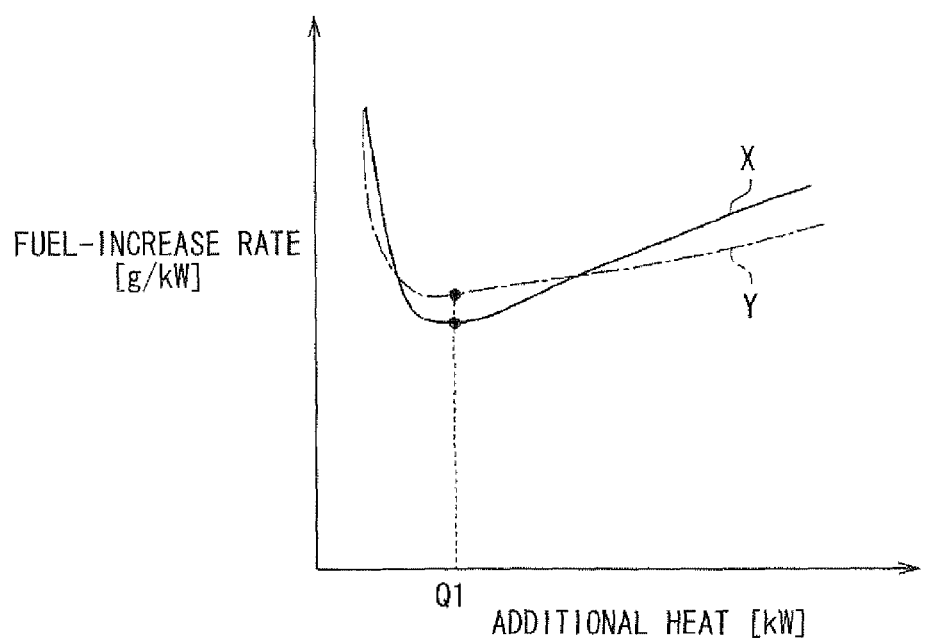
FIG. 5 is a characteristic chart showing a relationship between an additional heat quantity $\Delta Q$ and a fuel-increase-rate $\eta$.

FIG. 5 is a characteristic chart showing a relationship between the "$\eta$" relative to the additional heat quantity $\Delta Q$ at two engine operation points "X" and "Y". As shown in FIG. 5, the fuel-increase-rate "$\eta$" depends on the additional heat quantity $\Delta Q$. The fuel-increase-rate "$\eta$" has a minimum point in a range where the additional heat quantity $\Delta Q$ can be set. In a case that a specified additional heat quantity "Q1" is generated, the fuel-increase-rate "$\eta$" at the engine operation point "X" is smaller than that at the engine operation point "Y".

Although the fuel-increase-rate "$\eta$" has a minimum point in FIG. 5, the fuel-increase-rate "$\eta$" may be linearly increased or decreased relative to the additional heat quantity $\Delta Q$.

According to the present embodiment, when a heat-utilize requirement is generated, the fuel-increase-rate is computed and this computed fuel-increase-rate is compared with a reference rate to determine whether the waste heat generation will be performed by the waste heat control (waste-heat-generation control).

Specifically, the fuel-increase-rate "$\eta$" is compared with a reference fuel-increase-rate "$\eta th$" which is permissible upper value. When the fuel-increase-rate "$\eta$" is less than or equal to the reference fuel-increase-rate "$\eta th$", the waste heat quantity is increased. Meanwhile, when the fuel-increase-rate "$\eta$" is not less than the reference fuel-increase-rate "$\eta th$", the waste heat quantity is not increased even if the heat-utilize requirement is generated.

According to the present embodiment, as long as the fuel-increase-rate "$\eta$" is not less than the reference fuel-increase-rate "$\eta th$", the engine 10 is controlled to generate the maximum additional heat quantity.

The waste heat control will be described in detail hereinafter. In this control, when the heat-utilize requirement is generated, the fuel-increase-rate "$\eta$" is compared with the reference fuel-increase-rate "$\eta th$". When the fuel-increase-rate "$\eta$" is generally larger than the reference rate "$\eta th$", the waste heat quantity is not increased. In this case, even if the fuel-increase-rate "$\eta$" is the minimum value "$\eta min$" in a characteristic chart shown in FIG. 5, the waste heat quantity is not increased. Meanwhile, when the fuel-increase-rate "$\eta$" is generally lower than the reference rate "$\eta th$", the waste heat quantity is intensively increased. Consequently, the waste heat quantity corresponding to the required feat quantity "Qrq" is generated on an average and the fuel consumption can be made small as much as possible.

It should be noted that an excessive heat energy of the engine waste with respect to the required heat quantity is stored in the engine coolant until it becomes needed.

Figure 6:
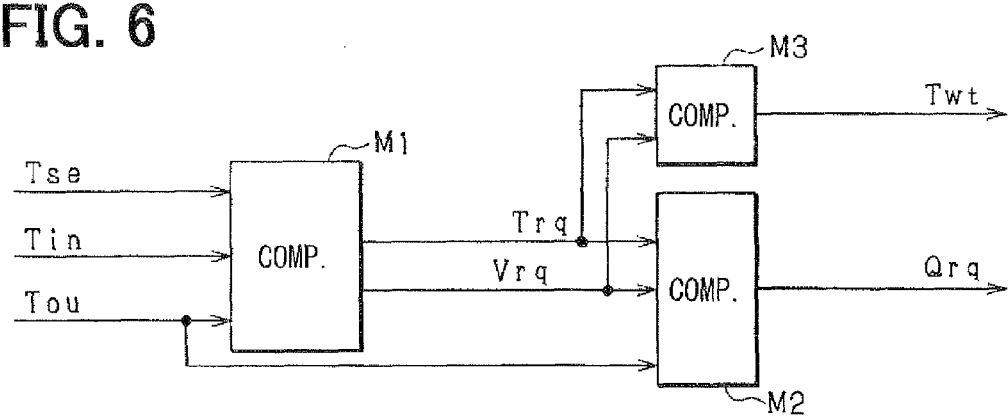
FIG. 6 is a functional block diagram for computing a required heat quantity and a target engine coolant temperature.
Figure 7:
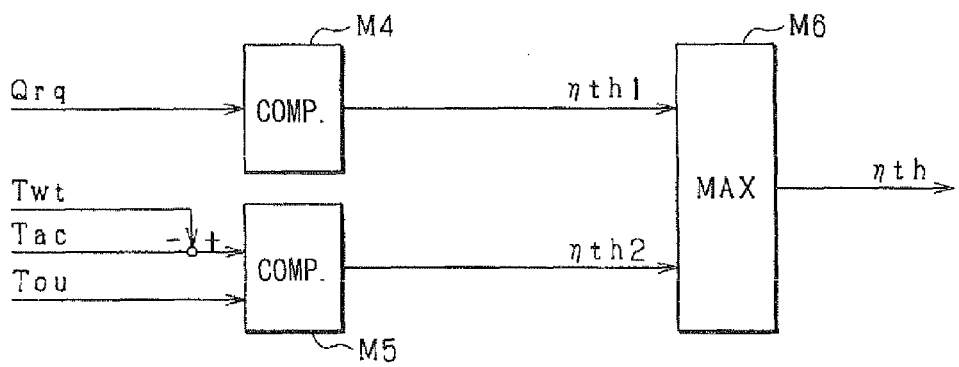
FIG. 7 is a functional block diagram for computing a reference fuel-increase-rate.
Figure 8:
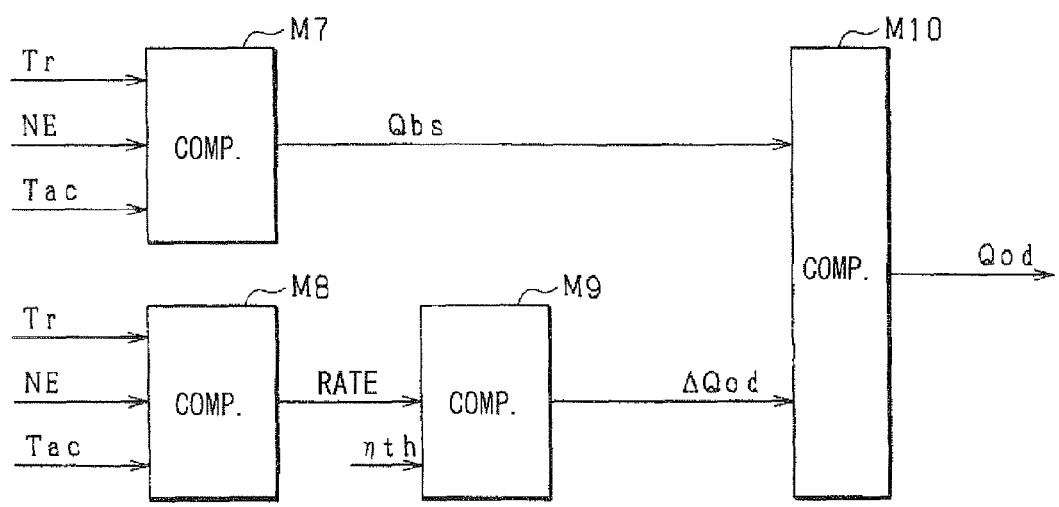
FIG. 8 is a functional block diagram for computing a command heat quantity.

FIGS. 6 to 8 are block diagrams for computing parameters relating to the heat quantity of the waste heat control. FIG. 6 is for explaining a computation of the required heat quantity "Qrq" and a target engine coolant temperature "Twt". FIG. 7 is for explaining a computation of the reference fuel-increase-rate "$\eta th$", and FIG. 8 is for explaining a computation of the command heat quantity "Qod". The required heat quantity "Qrq" and the target engine coolant temperature "Twt" are computed by the air-conditioner-ECU 50. The reference fuel-increase-rate "$\eta th$" and the command heat quantity "Qod" are computed by the heat-management-ECU 60. In FIGS. 6 to 8, it is assumed that a heating requirement is generated as the heat-utilize requirement.

First, the required heat quantity "Qrq" and the target engine coolant temperature "Twt" will be described. In FIG. 6, an air-temperature/airflow-rate (ATAR) computing portion M1 computes a required outlet air temperature "Trq" and a required outlet airflow rate "Vrq" based on a set temperature "Tse", an interior temperature Tin, and an exterior temperature "Tou" by use of a map. A required heat quantity (RHQ) computing portion M2 computes the required heat quantity "Qrq" based on the required outlet air temperature "Trq", the required outlet airflow rate "Vrq" and the exterior temperature "Tou".

Figure 9:
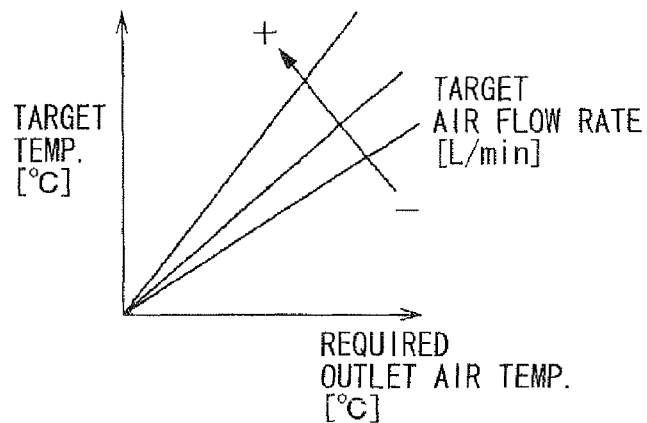
FIG. 9 is a chart showing a target engine coolant temperature map.

A target coolant temperature (TCT) computing portion M3 computes a target engine coolant temperature "Twt" based on the required outlet air temperature "Trq" and the required outlet airflow rate "Vrq" by use of a target coolant temperature map shown in FIG. 9. As shown in FIG. 9, the target coolant temperature map stores the target engine coolant temperature "Twt" corresponding to the required outlet air temperature "Trq" and the required outlet airflow rate "Vrq". The target engine coolant temperature "Twt" is computed by use of this map. As the required outlet air temperature "Trq" becomes higher, or as the required outlet airflow rate "Vrq" becomes higher, the target engine coolant temperature "Twt" becomes larger.

Then, the reference fuel-increase-rate "ηth" will be described hereinafter. In FIG. 7, a first reference computing portion M4 computes a first reference fuel-increase-rate ηth1 based on the required heat quantity "Qrq" computed by the RHQ computing portion M2. A second reference computing portion M5 computes a second reference fuel-increase-rate "ηth2" based on the target engine coolant temperature "Twt", a current engine coolant temperature "Tac" and the exterior temperature "Tou". Then, a reference setting portion M6 defines the reference fuel-increase-rate "ηth" which is larger one of the first reference fuel-increase-rate "ηth1" and the second reference fuel-increase-rate "ηth2".

Figure 10:
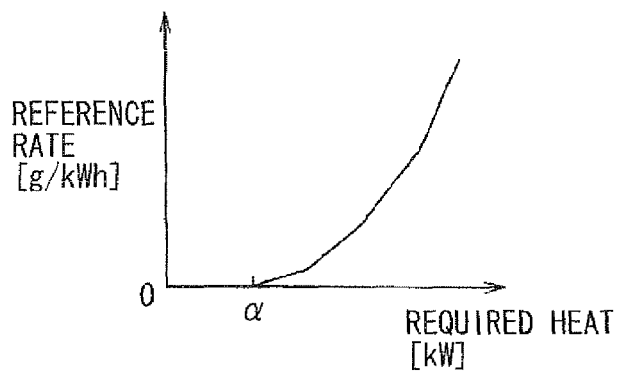
FIG. 10 is a chart showing a first reference computing map.

The first reference computing portion M4 and the second reference computing portion M5 will be described in detail. The first reference computing portion M4 computes the first reference fuel-increase-rate "ηth1" based on the required heat quantity "Qrq" by use of a first reference computing map shown in FIG. 10. As shown in FIG. 10, the first reference computing map defines a relationship between the first reference fuel-increase-rate "ηth1" and the required heat quantity "Qrq". When the required heat quantity "Qrq" is less than or equal to a specified value α, the first reference fuel-increase-rate "ηth1" is zero. When the required heat quantity "Qrq" is not less than the specified value α, the first reference fuel-increase-rate "ηth1" increases along with the required heat quantity "Qrq". It should be noted that the specified value α is an upper limit value of the required heat quantity with which the heat-utilize requirement is satisfied at the best fuel economy point.

Figure 11:
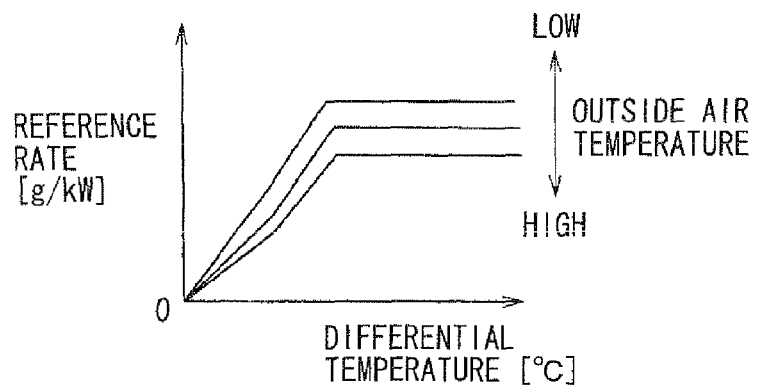
FIG. 11 is a chart showing a second reference computing map.

A second reference computing portion M5 computes a second reference fuel-increase-rate "ηth2" based on the target engine coolant temperature "Twt", a current engine coolant temperature "Tac" and the exterior temperature "Tou". As shown in FIG. 11, the second reference computing map defines a relationship between a temperature difference ΔTw, which is obtained by subtracting the current coolant temperature "Tac" from the target coolant temperature "Twt", the exterior temperature "Tou" and the second reference fuel-increase-rate "ηth2". The second reference fuel-increase-rate "ηth2" is computed based on the temperature difference ΔTw and the exterior temperature "Tou". According to the second reference computing map, the second reference fuel-increase-rate "ηth2" increases along with the temperature difference ΔTw and the exterior temperature "Tou". When the temperature difference ΔTw exceeds a specified value, the second reference fuel-increase-rate "ηth2" becomes maximum value.

Then, the command heat quantity "Qod" will be described hereinafter. In FIG. 8, a base-heat-quantity computing portion M7 computes a base heat quantity "Qbs" based on the engine torque "Tr", the engine speed NE and the engine coolant temperature "Tac" by use of a map. The base heat quantity "Qbs" corresponds to a heat quantity which the engine 10 generates at the best fuel economy point.

A characteristic computing portion M8 computes a fuel-increase-rate characteristic based on the engine torque "Tr", the engine speed NE and the engine coolant temperature "Tac".

An additional-heat-quantity computing portion M9 computes the command additional value ΔQod of the additional heat quantity ΔQ based on the fuel-increase-rate characteristic and the reference fuel-increase-rate "ηth".

A command-heat-quantity computing portion M10 computes the command heat quantity "Qod" by adding the command additional value ΔQod to the base heat quantity "Qbs".

The characteristic computing portion M8 and the additional-heat-quantity computing portion M9 will be described in detail. The characteristic computing portion M8 stores a map which defines a relationship between the fuel-increase-rate "η" and parameters, such as engine torque "Tr", the engine speed NE, and the engine coolant temperature "Tac". The characteristic computing portion M8 computes the fuel-increase-rate characteristic representing a relationship between the additional heat quantity ΔQ and the fuel-increase-rate η. Based on this fuel-increase-rate characteristic, the minimum value of the fuel-increase-rate "η" can be obtained for every additional heat quantity ΔQ.

In the additional-heat-quantity computing portion M9, the fuel-increase-rate characteristic and the reference fuel-increase-rate "ηth" are compared with each other. When the fuel-increase-rate "η" is not greater than the reference fuel-increase-rate "ηth", the maximum value of the additional heat quantity ΔQ is defined as the command additional heat quantity ΔQod. Meanwhile, no fuel-increase-rate "η" is less than or equal to the reference fuel-increase-rate "ηth", the command additional heat quantity ΔQod is set to zero.

Figure 12A:
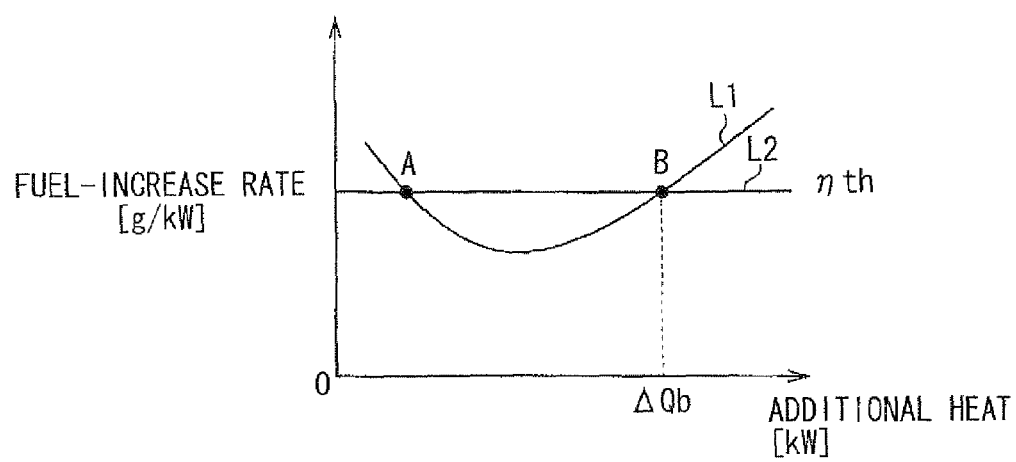
FIGS. 12A and 12B are charts for explaining a computation method of command additional heat quantity.
Figure 12B:
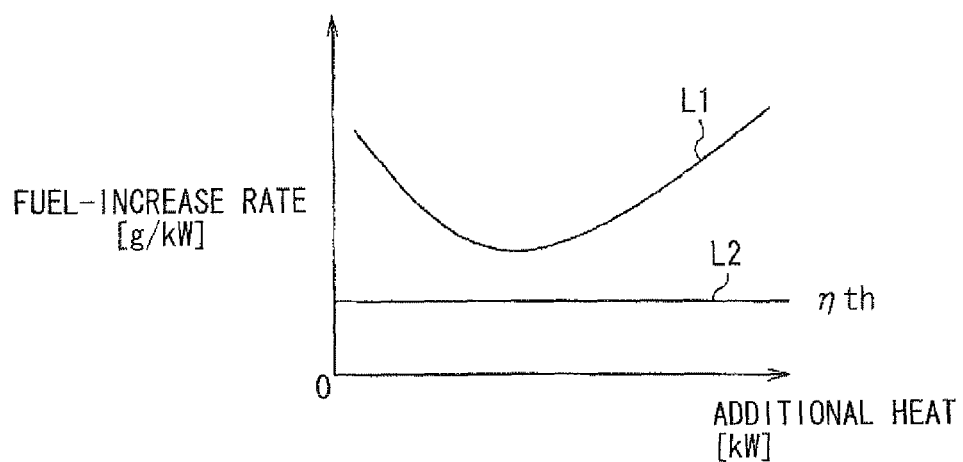

FIGS. 12A and 12B are charts for explaining a computing method of the command additional heat quantity ΔQod in the portion M9. FIG. 12A shows a case where the fuel-increase-rate "η" is less than or equal to the reference fuel-increase-rate "ηth" in a specified range of the additional heat quantity. FIG. 12B shows a case where no fuel-increase-rate "η" is less than or equal to the reference fuel-increase-rate "ηth". In FIGS. 12A and 12B, the fuel-increase-rate characteristic is represented by a curved line having a minimum value.

In FIG. 12A, a curved line L1 representing the fuel-increase-rate characteristic intersects with a straight line L2 representing the reference fuel-increase-rate "ηth" at a point "A" and a point "B". The maximum value ΔQb in a range of additional heat quantity between the points "A" and "B" is defined as the command additional heat quantity ΔQod.

Meanwhile, when no fuel-increase-rate "η" is less than or equal to the reference fuel-increase-rate "ηth", as shown in FIG. 12B, a curved line L1 does not intersect with a straight line L2. In this case, the command additional heat quantity ΔQod is set to zero.

When the maximum value ΔQb is defined as the command additional heat quantity ΔQod, the heat quantity corresponding to the command additional heat quantity ΔQod is generated by the engine 10 to increase the engine waste heat quantity. Also the engine coolant temperature is increased and the interior temperature Tin is increased, whereby the required heat quantity "Qrq" is decreased accordingly. Therefore, after the maximum value ΔQb is defined as the command additional heat quantity ΔQod, the reference fuel-increase-rate "ηth" is gradually decreased along with an advance of the waste heat increase control. Then, the command additional heat quantity ΔQod is gradually decreased and the curved line L1 does not intersect with the straight line L2 to stop an increase in the waste heat quantity. That is, in this system, the waste heat increase is conducted to generate maximum waste heat quantity based on the fuel-increase-rate. Then, when the fuel-utilize requirement is satisfied, the waste heat increase is stopped.

Figure 13:
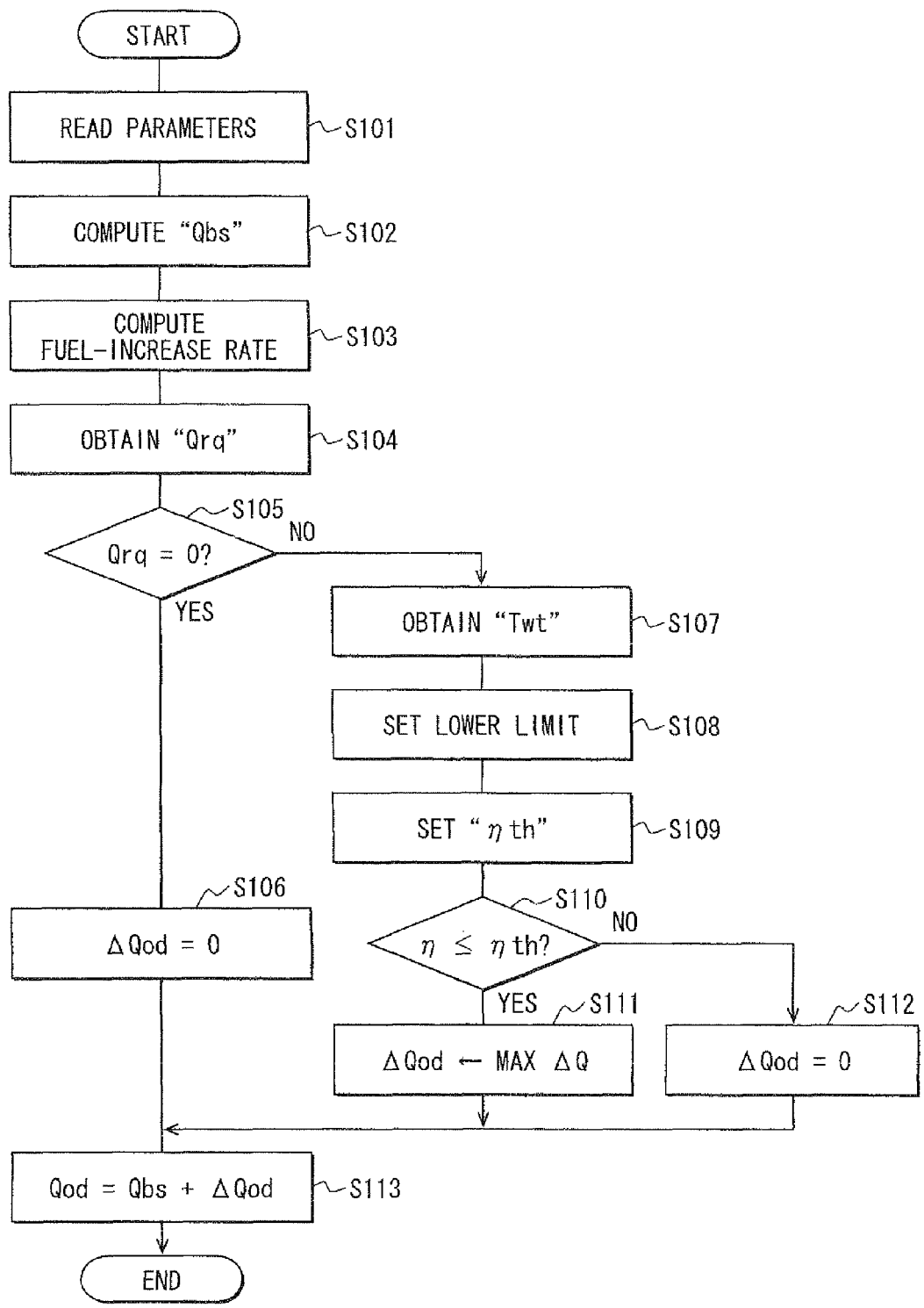
FIG. 13 is a flowchart showing a computing processing of a command heat quantity.

Next, a computing processing of the command heat quantity "Qod" will be described hereinafter. FIG. 13 is a flowchart showing a computing processing of the command heat quantity "Qod". This processing is executed in a specified cycle by the heat-management-ECU 60.

In step S101, the current parameters, such as engine torque and engine coolant temperature, are read. In step S102, the base heat quantity "Qbs" is computed based on the engine torque, the engine speed and the engine coolant temperature. In step S103, the fuel-increase-rate characteristic is computed based on the current engine speed, the engine torque and the engine coolant temperature.

In step S104, the required heat quantity "Qrq" is read. In step S105, the computer determines whether the required heat quantity "Qrq" is zero. When YES in step S105, the procedure proceeds to step S106 in which the command additional heat quantity ΔQod is set to zero.

When NO in step S105, the procedure proceeds to step S107 in which the target engine coolant temperature "Twt" is read. In step S108, if the target engine coolant temperature "Twt" is less than a predetermined lower limit value (for example, 40° C.) which is required for warming up the engine, this target engine coolant temperature "Twt" is reset as the lower limit value.

In step S109, the reference fuel-increase-rate "ηth" is computed. Specifically, the first reference fuel-increase-rate "ηth1" is computed based on the required heat quantity "Qrq" by use of a reference computing map shown in FIG. 10. The second reference fuel-increase-rate "ηth2" is computed based on the target engine coolant temperature "Twt", the current engine coolant temperature "Tac" and the exterior temperature "Tou". Then, a larger one of the rates "ηth1" and "ηth2" is defined as the reference fuel-increase-rate "ηth".

Then, in steps S110 to S112, the command additional heat quantity ΔQod is computed. In step S110, the computed fuel-increase-rate characteristic is compared with the reference fuel-increase-rate "ηth". When the fuel-increase-rate "η" is not greater than the reference fuel-increase-rate "ηth", the procedure proceeds to step S111 in which the maximum value of the additional heat quantity ΔQ is defined as the command additional heat quantity ΔQod. Meanwhile, when no fuel-increase-rate "η" is less than or equal to the reference fuel-increase-rate "ηth", the procedure proceeds to step S112 in which the command additional heat quantity ΔQod is set to zero.

In step S113, the command additional heat quantity ΔQod is added to the base heat quantity "Qbs" to obtain the command heat quantity "Qod". This command heat quantity "Qod" is transmitted to the engine-ECU 40. The engine-ECU 40 controls the engine driving condition based on the command heat quantity "Qod". In the present embodiment, the engine-ECU 40 selects one of the waste-heat-quantity control means which increase the waste heat quantity. Specifically, the engine-ECU 40 executes the waste heat control based on the command heat quantity "Qod" and the engine driving condition by use of the selected waste-heat-quantity control means. Thereby, a deterioration in engine driving efficiency is restricted.

According to the present embodiment, following advantages can be obtained.

When a heat-utilize requirement is generated, the fuel-increase-rate "η" is computed to be compared with the reference fuel-increase-rate "ηth". Based on the comparison result, it is determined whether the waste-heat-generation control will be performed. Thus, the waste-heat-generation control is timely performed to satisfy the required heat quantity and to reduce the fuel consumption on average.

Since the maximum value of the additional heat quantity ΔQ is set as the command additional heat quantity ΔQod and the waste heat increase is performed based on the command additional heat quantity ΔQod, a heat energy is intensively generated by the engine 10 in a case where the engine waste heat is effectively generated.

Since the reference fuel-increase-rate "ηth" is variable set according to the required heat quantity "Qrq", it can be determined whether the waste heat increase will be performed in accordance with the required heat quantity "Qrq". The engine waste heat quantity can be generated corresponding to the required heat quantity "Qrq".

Since the reference fuel-increase-rate "ηth" is variably set based on the engine coolant temperature, a quick heating can be ensured to satisfy the heat-utilize requirement.

Since the target engine coolant temperature "Twt" is established based on the required outlet air temperature "Trq" and the required outlet air quantity "Vrq", the interior of the vehicle can be quickly warmed even right after the engine is started.

Since the lower limit of the target engine coolant temperature "Twt" is set to a predetermined value (for example 40° C.) which is required for warming up the engine, a stability of fuel combustion can be improved. Further, a deterioration in emission and a variation in torque can be restricted.

Since the reference fuel-increase-rate "ηth" is variably set based on the exterior temperature "Tou", the heat-utilize requirement is promptly satisfied even if the exterior temperature "Tou" is relatively low.

The present invention is not limited to the embodiments described above, but may be performed, for example, in the following manner.

The fuel-increase-rate can be defined as additional heat quantity ΔQ per a unit additional fuel quantity Δqf.

In a region where the fuel-increase-rate "η" is not greater than the reference fuel-increase-rate "ηth", any additional heat quantity which the engine 10 can generate may be defined as the command additional heat quantity "Qod".

An average of the first reference fuel-increase-rate "ηth1" and the second reference fuel-increase-rate "ηth2" may be defined as the reference fuel-increase-rate "ηth". Alternatively, smaller one of the first reference fuel-increase-rate "ηth1" and the second reference fuel-increase-rate "ηth2" may be defined as the reference fuel-increase-rate "ηth". Alternatively, only one of the first reference fuel-increase-rate "ηth1" and the second reference fuel-increase-rate "ηth2" may be defined as the reference fuel-increase-rate "ηth".

The upper limit value of the reference fuel-increase-rate "ηth" can be variably set in accordance with a driving mode which a driver selects. The driving mode includes an economy mode in which a fuel economy has a first priority and a heat-utilize mode in which heat-utilize requirement has a first priority. In a case that the economy mode is selected, the upper limit value of the reference fuel-increase-rate "η" is set lower than the case where the heat-utilize mode is selected. Alternatively, in a case that the heat-utilize mode is selected, the upper value of the reference fuel-increase-rate "ηth" is not established. In a case that the economy mode is selected, the upper value of the reference fuel-increase-rate "ηth" is established.

The heat-utilize requirement includes an engine warming-up requirement.

A heat recovery device can be provided to the exhaust pipe 12 downstream of the catalyst 22. The heat recovery device recovers heat energy of the exhaust gas flowing through the exhaust pipe 12.

The engine-ECU 40 may compute the command heat quantity "Qod" without the heat-management-ECU 60.

Another embodiment will be described hereinafter.

In this embodiment, a controller controls a heat-supply from a plurality of heat sources to heat-exchange portions and controls an electric-power-supply from a plurality of electric-power sources to electric loads.

Figure 14:
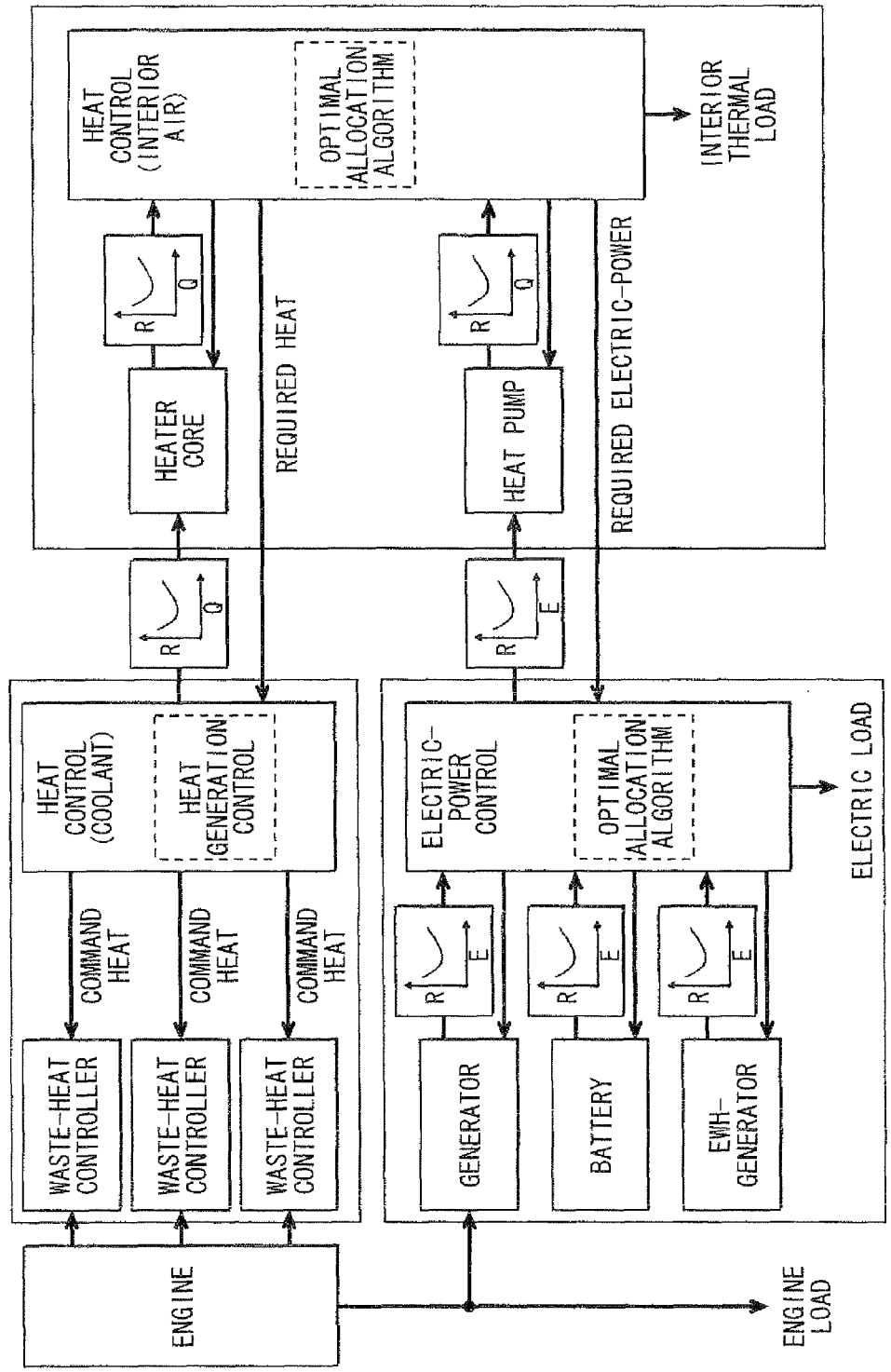
FIG. 14 is a block chart showing a heat-supply/electric-power-supply system.

FIG. 14 is a block chart showing a heat-supply/electric-power-supply system. In this system, a heat-supply quantity from each heat source is determined in such a manner that the fuel consumption is decreased.

The multiple heat sources include heated engine coolant and a heat pump apparatus. The engine coolant receives heat from an engine through waste-heat-quantity (WHQ) controllers No. 1-No. 3.

The WHQ-controllers No. 1-No. 3 control the heat quantity in such a manner that the fuel consumption becomes the minimum value. Specifically, a heat management (waste-heat-generation control) is conducted so that a fuel increase rate of the WHQ-controllers No. 1-No. 3 becomes minimum value. The fuel increase rate represents a consumed fuel quantity for generating a unit heat quantity. In a heat management of the engine coolant, the engine is controlled so that a command heat quantity is supplied to the engine coolant through the WHQ-controllers No. 1-No. 3.

Furthermore, a heat quantity supplied by the heat pump system is also considered. Each heat quantity supplied from the engine coolant and the heat pump system is determined in such a manner that the fuel consumption becomes the minimum value.

Also in this moment, a heat management (optimum-allocation algorithm) is conducted so that fuel increase rate becomes the minimum value. In a heat management of the interior of the vehicle, a heat quantity required to be supplied to the engine coolant is considered in the heat management of the engine coolant. The heat pump system is controlled to generate a command heat quantity. The heater core is also controlled to generate a command heat quantity.

Further, the vehicle is provided with a plurality of electric-power sources. The electric-power supplied from each electric-power source is controlled in such a manner that the fuel consumption becomes the minimum value.

The multiple electric-power sources include an alternator, a battery, and a generator utilizing engine waste heat. An electric-power management (optimum-allocation algorithm) is conducted in such a manner that the fuel consumption becomes the minimum value. In a heat management of the interior of the vehicle, an electric-power required to be supplied to the electric load including heat pump system is considered in the electric-power management. In the electric-power management, each electric-power is controlled to generate a command electric-power.

When operating the heat pump system, a certain amount of electric-power is necessary. A specified fuel quantity is consumed to generate this electric-power.

As described above, when heating the interior of the vehicle, the heat supply and the electric-power supply are controlled in such a manner that the fuel consumption becomes the minimum value.

Figure 15:
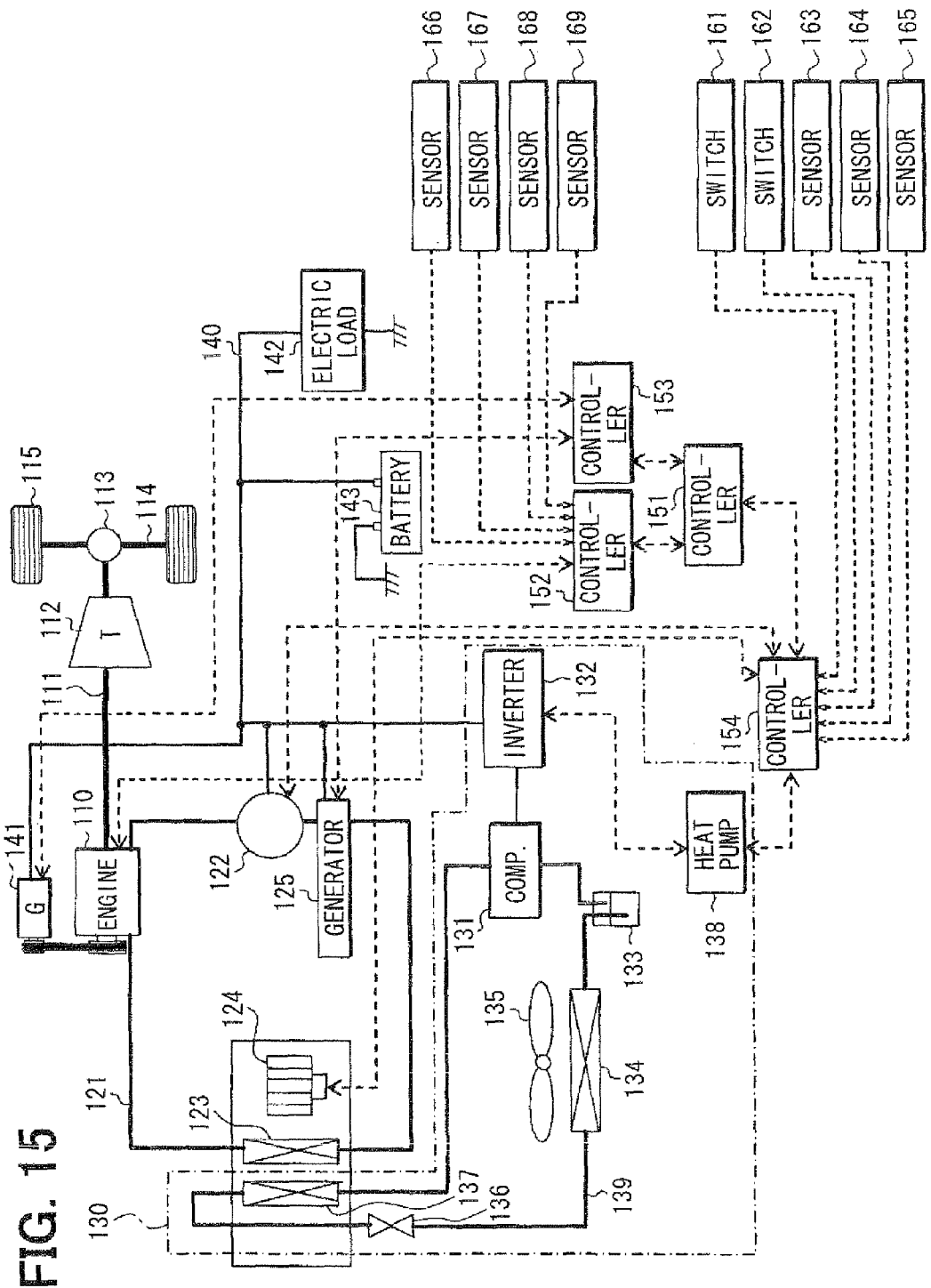
FIG. 15 is a schematic view showing the heat-supply/electric-power-supply system.

FIG. 15 is a schematic view showing a system of the present embodiment. In this system, the engine 110 is a multi-cylinder gasoline engine of the spark ignition type, and is equipped with a throttle valve, an intake valve, an exhaust valve, a fuel injector, an ignition device, valve timing controllers which adjust valve timing of the intake valve and the exhaust valve.

A driving force of the engine 110 is transmitted to the transmission 112 through a drive shaft 111, and also is transmitted to an axle shaft 114 and the wheel 115 through a differential 113. Meanwhile, at the time of the deceleration of vehicles, the torque of wheels 115 is transmitted to the transmission 112 through the axle shaft 114 and the differential 113, and also is transmitted to the engine 110 through the drive shaft 111.

An engine coolant flows through a water jacket of the engine 110. An engine coolant pipe 121 is connected to the water jacket, and a water pump 122 circulates the coolant in the engine coolant pipe 121. A circulation quantity of the engine coolant in the pipe 121 depends on a discharge quantity of the water pump 122.

A heater core 123 is arranged in the engine coolant pipe 121. Air flowing through the heater core 123 receives heat from the heater core 123 to be heated. The heated air is introduced into a passenger compartment (interior of vehicle).

The heat quantity supplied to the passenger compartment from the heater core 123 through the engine coolant is controlled by adjusting the discharge quantity of the water pump 122 and a driving condition of a blower fan 124.

A generator utilizing engine waste heat (EWH-generator) 125 is disposed in the engine coolant pipe 121. The EWH-generator 125 is equipped with a waste-heat regenerator which converts the heat of the engine coolant into kinematic energy. The EWH-generator 125 receives the kinematic energy to generate electric-power. This electric-power is supplied to a power supply circuit 140.

The present system is provided with a heat pump system 130 (electric heat source). The heat pump system 130 is comprised of an electric compressor 131, an inverter 132 for compressor, an interior heat exchanger 137, an exterior heat exchanger 134, a fan 135, an expansion valve 136, an accumulator 133, a refrigerant pipe 139 and a heat-pump controller 138.

The electric compressor 131 compresses the refrigerant, and this compressed refrigerant flows into the interior heat exchanger 137. An air flowing through the interior heat exchanger 137 receives heat from the interior heat exchanger 137. The heated air is introduced into the interior of the vehicle. At this moment, the refrigerant radiates the heat.

The refrigerant passed through the interior heat exchanger 137 is decompressed by the expansion valve 136 and flows into the exterior heat exchanger 134. A fan 135 introduces the outside air toward the exterior heat exchanger 134, and the refrigerant receives heat from the outside air flowing therethrough. The heated refrigerant is returned to the compressor 131 through the accumulator 133.

The compressor 131 is driven by an electric-power supplied from the inverter 132 which is controlled by the heat-pump controller 138. The heat quantity supplied to the interior of the vehicle is controlled by controlling a driving condition of the compressor 131.

The present system is provided with a generator 141 and a battery 143 as electric-power source. The generator 141 corresponds to an alternator or a motor generator. Each electric-power source is connected to the power supply circuit 140. The battery 143 is charged by electric-power supplied from the power supply circuit 140.

When decelerating the vehicle, the generator 141 performs a regenerative power generation by a rotational force transmitted to the engine 110 from the wheels 115.

The electric loads, such as the electric pump 122, the inverter 132, and a specific load 142 are connected to the power supply circuit 140. These electric loads receive electric-power through the power supply circuit 140.

The present system is equipped with an energy controller 151, an engine controller 152, a generator controller 153 and an air-condition controller 154. Each of these controllers 151-154 is comprised of a microcomputer including a CPU, a ROM, and a RAM. Each controller executes control programs stored in the ROM to perform various controls.

The energy controller 151 controls the electric pump 122, the blower fan 124 and the heat-pump controller 138 through the air-condition controller 154. Further, the energy controller 151 controls the EWH-generator 125 and the generator 141 through the generator controller 153. The energy controller 151 controls a driving condition of the engine 110 through the engine controller 152.

The present system is provided with an A/C switch 161, a temperature setting switch 162, an internal temperature sensor 163, an exterior temperature sensor 164, and an outlet air temperature sensor 165. The air-condition controller 154 receives detection signals from these sensors.

The engine controller 152 executes a various control of the engine 110 according to its driving condition. The present system is provided with an engine speed sensor 167, an engine load sensor 168, a coolant temperature sensor 169, and a vehicle speed sensor 166. The engine controller 152 receives detection signals from these sensors.

The engine controller 152 executes a fuel injection control, an ignition timing control, a valve timing control, and an intake air quantity control.

In each control, basically, an engine-shaft efficiency (fuel consumption rate) is varied according to a driving condition of the engine 110. In view of this, each control is executed based on adapted data such that the engine shaft efficiency becomes the maximum value.

In this system, when increasing the engine waste heat quantity, a waste-heat-generation control is executed so that the waste heat quantity is increased while the fuel consumption is restricted as much as possible. Specifically, this control system is provided with a plurality of waste-heat-quantity control means for increasing the waste heat quantity. When the heat-utilize requirement is generated, a combination of the waste-heat-quantity control means is selected in such a manner that a total heat-fuel rate of the waste-heat-quantity control means becomes the minimum value. The heat-fuel rate represents a fuel consumption to generate a unit waste heat quantity.

The waste-heat-generation control will be described hereinafter. In this control system, at least one of following controls is executed to increase the engine waste heat quantity:
 (A) Retarding the ignition timing;
 (B) Advancing the opening timing of the intake valve; and
 (C) Retarding the opening timing of the exhaust valve.
 By the selected waste-heat-quantity control means, the engine waste heat quantity is increased.

Further, the waste-heat-quantity control means includes followings:
 (1) Means for retarding the exhaust valve opening timing;
 (2) Means for advancing the intake valve opening timing; and
 (3) Means for retarding the ignition timing.

Figure 16:
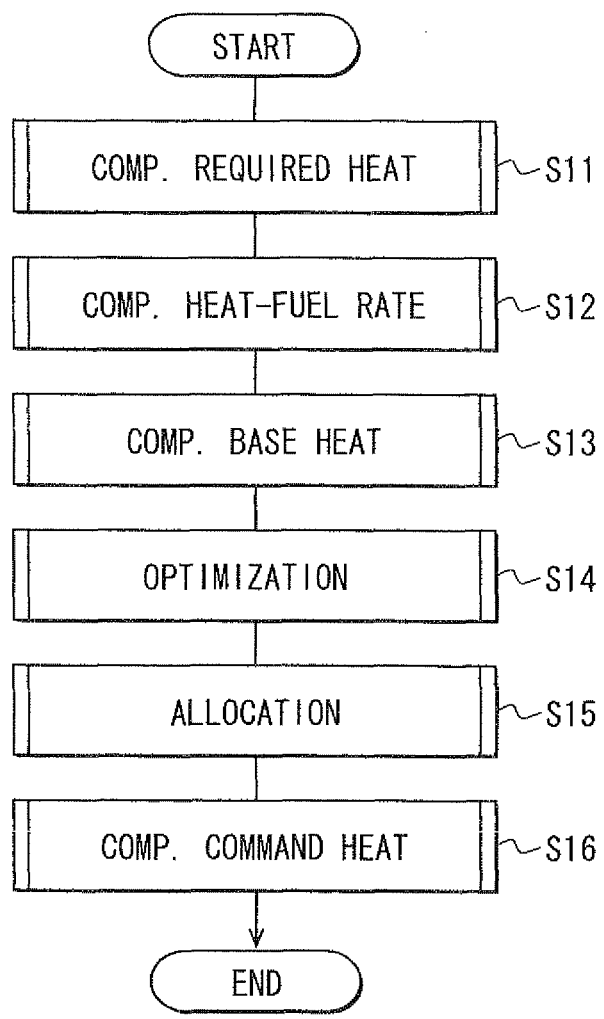
FIG. 16 is a flowchart showing a processing of the heat-supply control.

FIG. 16 is a flowchart showing a processing of a heat-supply control. The processing is repeatedly executed at regular intervals. Also, a processing of an electric-power-supply control is executed at the same time.

In step S11, the air-condition controller 154 computes a required heat quantity which is required to be supplied to each heat exchanger from a plurality of heat sources in response to a driver's request. The air-condition controller 154 transmits a signal indicative of the required heat quantity to the energy controller 151.

In step S12, the energy controller 151 computes the heat-fuel rate of each heat source. The heat-fuel rate of the heat pump system 130 is computed based on the heat quantity supplied by the heat pump system 130 and a consumed fuel quantity to generate electricity for operating the heat pump system 130. At this moment, the electric-power supply from multiple electric-power sources is controlled in such a manner that the fuel consumption for generating the electric-power becomes the minimum value. This electric-power supply control will be described later.

In step S13, the energy controller 151 computes a base heat quantity which can be supplied without any fuel consumption. The energy controller 151 computes the fuel consumption of each heat source as a function of the heat-fuel rate. Based on this function, the energy controller 151 computes a heat-quantity relationship between the supplied heat quantity and a fuel increase quantity per a unit heat quantity. In step S14, based on this heat-quantity relationship, an optimization computation is executed so that the fuel consumption becomes the minimum value.

In step S15, based on the result of the optimization computation, the base heat quantity of each heat source is computed with respect to the required heat quantity. An additional heat quantity of each heat source is computed to obtain the required heat quantity. Then, in step S16, a command heat quantity is computed with respect to each heat source. The command heat quantity corresponds to a summation of the base heat quantity and the additional heat quantity.

The energy controller 151 transmits a signal indicative of the command heat quantity to the air-condition controller 154 and the engine controller 152. The air-condition controller 154 and the engine controller 152 control each heat source so that the command heat quantity is generated.

Figure 26:
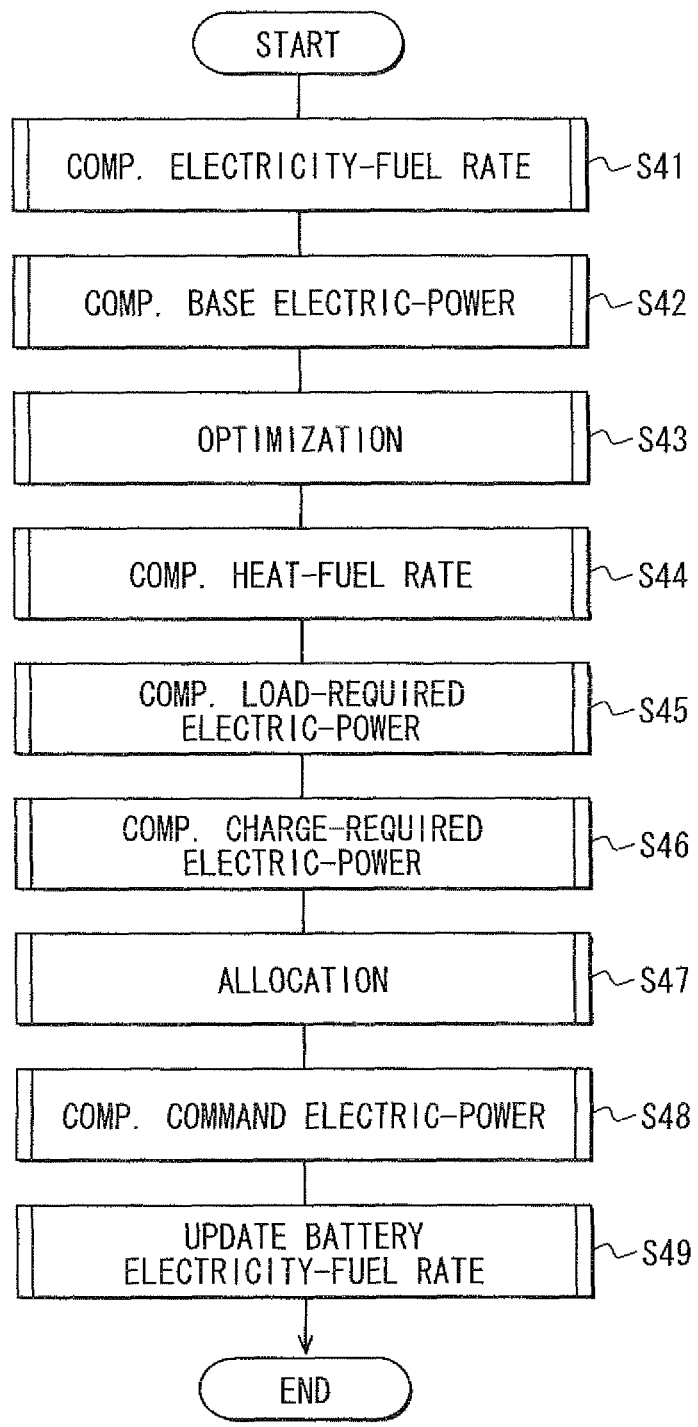
FIG. 26 is a flowchart showing a processing of an electric-power supply control.

FIG. 26 is a flowchart showing a processing of an electric-power-supply control. This processing is executed repeatedly at regular intervals.

In step S41, the energy controller 151 computes an electricity-fuel rate which represents a fuel quantity for generating a unit electric-power in each electric-power source. In step S42, the energy controller 151 computes a base electric-power which can be supplied without any fuel consumption. The energy controller 151 computes the fuel consumption of each electric-power source as a function of the electric-power. Based on this function, the energy controller 151 computes an electric-power relationship between the supplied electric-power and a fuel increase quantity per a unit electric-power. In step S43, based on this electric-power relationship, an optimization computation is executed so that the fuel consumption becomes the minimum value. In step S44, based on the optimization computation result, the heat-fuel rate of the heat pump system 130 is computed. This heat-fuel rate is used in step S12.

In step S45, the energy controller 151 receives a signal indicative of electric-power which the heat pump system 130 requires. This signal is transmitted from the air-condition controller 154. Further, the energy controller 151 receives signals indicative of electric-powers which the other electric loads require, and computes a load-required electric-power which should be supplied from electric-power source except the battery 143. In step S46, the energy controller 151 computes a charge-required electric-power which is required to charge the battery 143. At this time, the charge-required electric-power is computed to become the maximum value while the electricity-fuel rate of the electric-power is less than a specified reference value. Also, a total required electric-power of the load-required electric-power and the charge-required electric-power is computed.

In step S47, based on the result of the optimization computation, the energy controller 151 computes a base electric-power of each electric-power source with respect to the total required electric-power. An additional electric-power of each electric-power source is computed to obtain the total required electric-power. In step S48, a command electric-power is computed with respect to each electric-power source. The command electric-power corresponds to a summation of the base electric-power and the additional electric-power.

In step S49, the energy controller 151 updates the electricity-fuel rate of the battery 143 based on the charge-required electric-power and the fuel consumption at this time.

Then, the above heat supply control will be described in detail.

Figure 17:
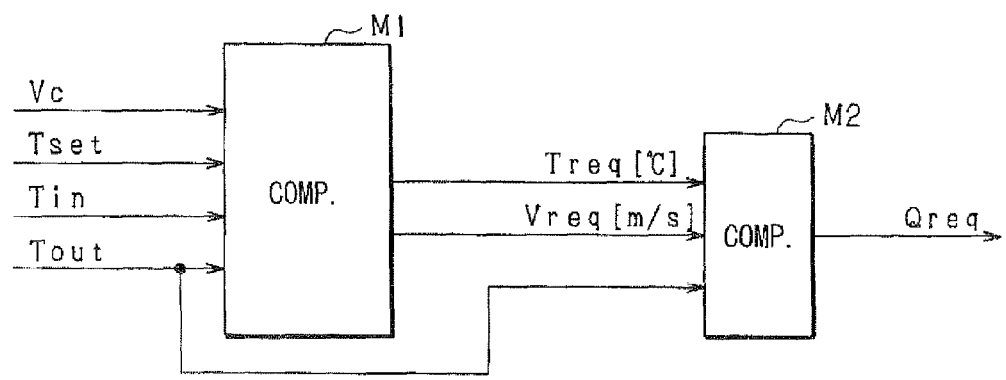
FIG. 17 is a functional block diagram for computing a required heat quantity.

FIG. 17 is a functional block diagram for computing the required heat quantity "Qreq" in step S11. The air-condition controller 154 is provided with an air-temperature/air-flow-rate computing portion M1 and a required heat quantity computing portion M2.

The computing portion M1 computes a required outlet air temperature "Treq" and a required outlet airflow rate "Vrq" based on a vehicle speed "Vc" detected by a vehicle speed sensor 166, a set temperature "Tse", an interior temperature "Tin", and an exterior temperature "Tout".

The required heat quantity computing portion M2 computes the required heat quantity "Qreq" based on the required outlet air temperature "Treq", the required outlet airflow rate "Vreq" and the exterior temperature "Tout".

The process in step S12 of FIG. 16 will be described in detail, hereinafter.

Figure 18:
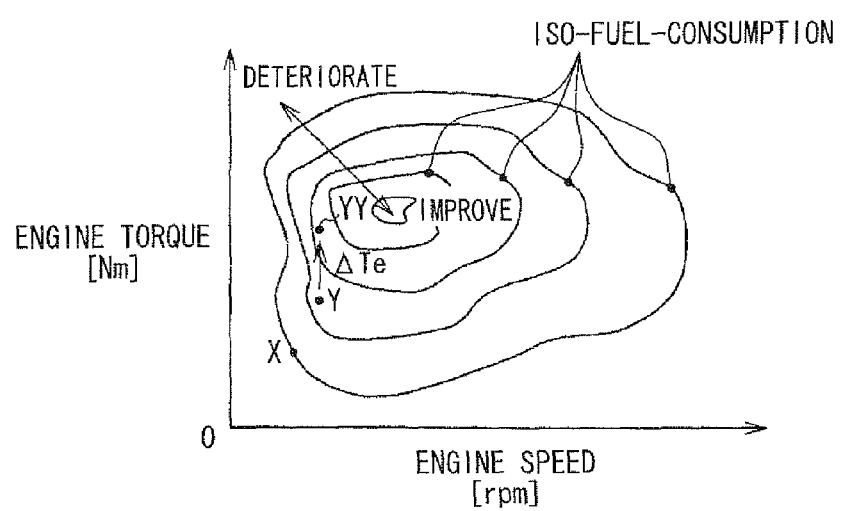
FIG. 18 is a map which shows a relationship between the engine operation point and a fuel consumption rate.

FIG. 18 shows a map which represents a relationship between the engine driving condition and a fuel consumption rate. In FIG. 18, the engine driving condition is represented by an engine speed and an engine torque.

In this control system, the heat energy is recovered from the fuel combustion energy through the engine coolant and is reused.

The waste-heat-generation control of the engine 110 is executed when a heat-utilize requirement is generated and the current waste heat quantity at the best engine shaft efficiency point does not satisfy the required heat quantity "Qreq". The waste-heat-generation control is executed to compensate the shortage of the current waste heat quantity.

In this case, in order to satisfy the required heat quantity "Qreq", as shown in FIG. 3, it is necessary to move an operation point of the engine 110 from a best engine shaft efficiency point "A" to another point "AA" so as to increase the waste heat quantity by a specified heat quantity ΔQ. By moving the operation point of the engine 110 from "A" to "AA", even though the fuel economy is deteriorated from the best engine shaft efficiency point, the specified heat quantity ΔQ is generated to be added to a base waste heat quantity at the best engine shaft efficiency point "A".

Figure 19:
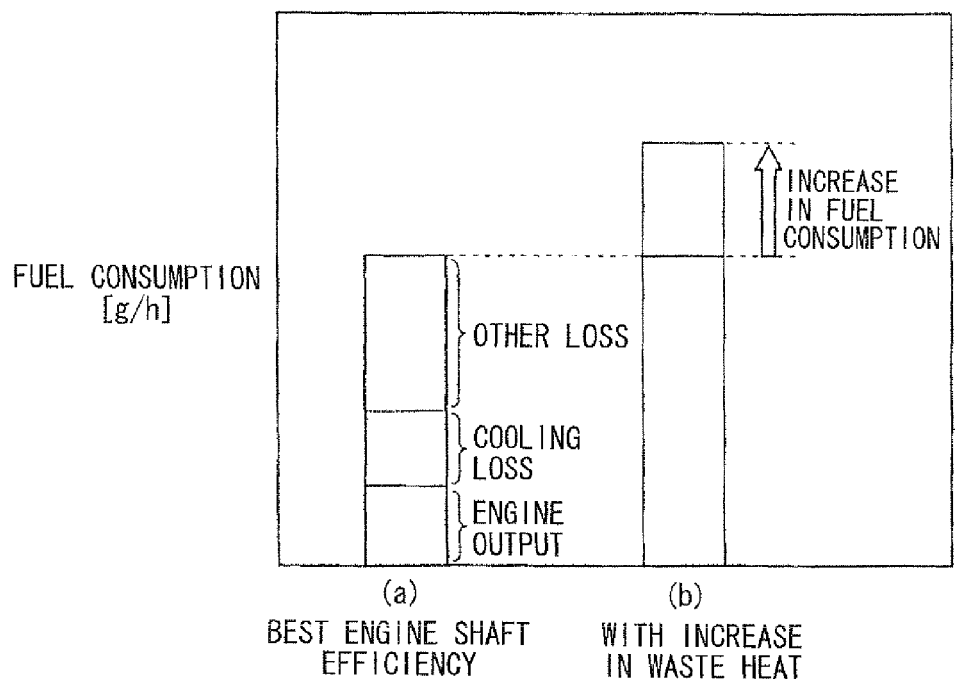
FIG. 19 is a graph showing a fuel increase quantity due to a generation of an additional heat quantity.

FIG. 19 is a bar chart for explaining a fuel consumption in a case the additional heat quantity is generated in response to the heat-utilize requirement. In FIG. 19, a bar (a) represents a fuel consumption [g/h] in a case that the engine is driven at the best engine shaft efficiency point "A", and a bar (b) represents a fuel consumption [g/h] in a case that the engine shaft efficiency point is moved from the best point "A" to another point "AA".

At the best engine shaft efficiency point "A", as shown by the bar (a), about 25% of the fuel combustion energy is converted into an shaft output of the engine 110 as the kinetic energy, about 25% of the fuel combustion energy corresponds to a cooling loss, and the other of the fuel combustion energy correspond to the other loss, such as a loss of auxiliary-machinery or an exhaust loss. The heat energy of the cooling loss is recovered through the engine coolant for warming the interior of vehicle and the like.

When the required heat quantity "Qreq" is increased and the heat energy of the cooling loss at the best engine shaft efficiency point "A" does not satisfy the increased "Qreq", the waste-heat-generation control is performed to generate the additional heat quantity to compensate the shortage of the heat quantity. In this case, it is preferable that an increase in the fuel consumption due to the generation of the additional heat quantity is small as much as possible. Then, a combination of the waste-heat-quantity control means (1)-(3) is determined so that the fuel increase quantity becomes the minimum value.

A fuel increase quantity (fuel increase rate) relative to the engine waste heat quantity depends on the engine operation point at which the waste heat quantity starts to be increased.

The fuel increase rate will be described hereinafter. The fuel increase rate is a parameter relating to a fuel consumption for increasing the waste heat quantity of the engine 110. Specifically, the fuel increase rate is a ratio between the additional heat quantity ΔQ generated by the waste-heat-generation control and an increased fuel quantity ΔF in a case that the waste-heat-quantity control means are combined in such a manner that the fuel increase quantity becomes minimum. For example, the fuel increase rate includes the heat-fuel rate which represents the fuel consumption for generating a unit heat quantity.

Heat-fuel Rate "Ct" g/kWh)=Increased Fuel Quantity
ΔF [g/h]/Additional Heat Quantity ΔQ [kW]

Figure 20:
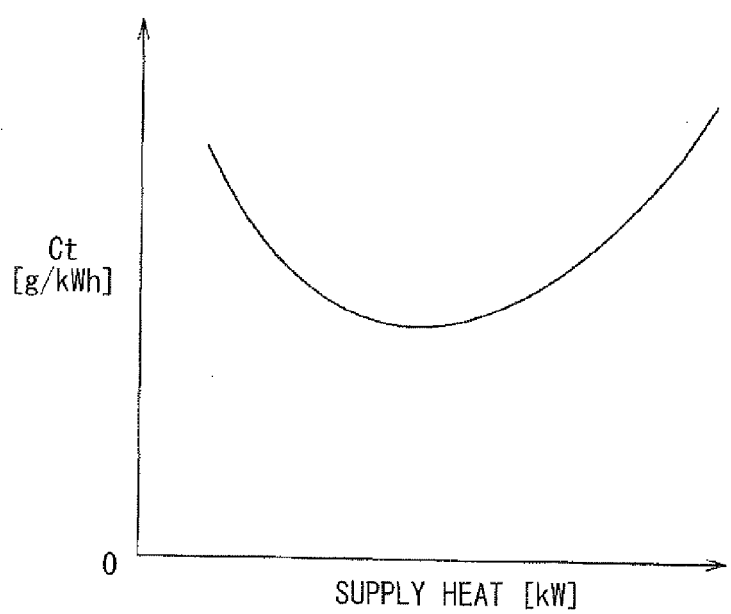
FIG. 20 is a characteristic chart showing a relationship between a supply heat quantity and a heat-fuel rate.

FIG. 20 is a characteristic chart showing the heat-fuel rate "Ct" relative to the additional heat quantity ΔQ at an engine operation points "X". This characteristic chart may be experimentally obtained. Alternatively, this characteristic may be obtained according to a model. These processes correspond to a heat-fuel ratio computing means. The heat-fuel rate "Ct" depends on the additional heat quantity ΔQ. The heat-fuel rate "Ct" has a minimum point in a range where the additional heat quantity ΔQ can be set.

In a case that a specified additional heat quantity "Q1" is generated, the heat-fuel rate "Ct" depends on the engine operation point. In the present system, the heat-fuel rate characteristic chart is computed according to the current engine operation point (engine driving condition).

Since the present system is provided with a heat pump system 130 (electric heat source), the heat-fuel rate characteristic of the heat pump system 130 is also computed.

Specifically, the fuel consumption for generating an electric-power which will be supplied to the heat pump system 130 by the generator 141 is computed.

Next, a processing for computing the base heat quantity of each heat source in step S13 will be explained in detail.

Regarding the engine 110, the heat energy corresponding to cooling loss shown in FIG. 19 is defined as the base heat quantity. The energy controller 151 receives a signal indicative of the engine driving condition from the engine controller 152 and computes the base heat quantity according to the engine driving condition.

Regarding the heat pump system 130, the maximum heat quantity which can be generated by the electric-power supplied from the generator 141 with the vehicle decelerated and by a base electric-power supplied from the EWH-generator 125 is defined as the base heat quantity. The base electric-power of the EWH-generator 125 will be described later.

The energy controller 151 sums the base heat quantity of each heat source to compute a total base heat quantity "Qbas_all".

A processing of the optimization computation executed in step S14 will be described in detail.

The energy controller 151 computes the fuel consumption "F" of each heat source with respect to the plurality of the heat quantity "Q" based on the heat-fuel rate characteristic chart. Specifically, the fuel consumption "F" is computed according to the following formula.

Fuel Consumption "$F$"=Heat-Fuel Rate "$Cf$"×Heat Quantity "$Q$"

This formula is approximated to a quadratic function based on a plurality of data of the heat quantity "Q" and the fuel consumption "F". That is, the fuel consumption "F" is expressed by a quadratic function of the heat quantity "Q". The relationship between the heat quantity "Q" and the fuel consumption "F" depends on each heat source. Generally, the fuel consumption "F" can be expressed by quadratic, cubic, or quartic function of the heat quantity "Q".

In order that the required heat quantity "Qreq" can be supplied and the fuel consumption can be made minimum, the heat quantity which each heat source supplies can be obtained by solving following optimization problems. That is, in a case that "Qall" denotes the total required heat quantity, "Q1", "Q2", ..., "Qn" denote supplied heat quantity from each heat source, and "F1", "F2", ..., "Fn" denote each fuel consumption.

Constraint: Qall=Q1+Q2+ ... +Qn
Objective function: f=F1(Q1)+F2(Q2)+ ... +Fn(Qn)

The heat quantities supplied from each heat source must be obtained so that the total fuel consumption "f" becomes the minimum value. The optimal solution of this problem can be obtained by Lagrange's method of undetermined multipliers as follows:

Objective function: $f(x1, x2, \ldots, xn)$

Constraint $g1(x1, x2, \ldots, xn) = 0$ $g2(x1, x2, \ldots, xn) = 0$ $g3(x1, x2, \ldots, xn) = 0$

...

...

...

$gm(x1, x2, \ldots, xn) = 0$

Decision variable: $x1, x2, \ldots, xn$

This original problem is converted into the following problem having no constraint by introducing new variables λ1, λ2, ..., λm (Lagrange multiplier).

Objective function: L (x1, x2, ..., xn, λ1, λ2, ..., λm)
Decision variable: x1, x2, ..., λ1, λ2, ..., λm The function "L" is referred to as Lagrange function and is defined as follows:

$$L(x1,x2,\ldots,xn,\lambda1,\lambda2,\ldots,\lambda m)=f(x1,x2,\ldots,xn)+ \lambda1 g1(x1,x2,\ldots,xn)+\ldots+\lambda m g(x1,x2,\ldots,xn)$$

Generally, the necessary condition for x1, x2, ..., xn to be the optimal solutions of the above-mentioned original problem is expressed by following formulas.

$$\frac{dL}{dx1}=0, \ldots, \frac{dL}{dxn}=0, \ldots, \frac{dL}{d\lambda1}=0, \ldots, \frac{dL}{d\lambda m}=0 \quad (1)$$

In a case that these formulas are applied to the above function "L", the Lagrange function is defined as follows:

$$L = \sum_{i=1}^{n} Fi(Qi) + \lambda\left(Qall - \sum_{i=1}^{n} Qi\right) \quad (2)$$

A necessary condition for obtaining an optimum solution is that a first order differentiation of the equation 2 with respect to the heat quantity "Qi" and the Lagrange multiplier "λ" is zero. That is, Q1, Q2, ... Qn an satisfying following formulas 3 and 4 are optimal solutions.

$$\frac{dL}{dQi} = \frac{dFi}{dQi} - \lambda = 0 \quad (3)$$
$(i = 1, \ldots, n)$ $$\frac{dL}{d\lambda} = Qall - (Q1 + Q2 + \ldots + Qn) = 0 \quad (4)$$

Since this formula 4 is a constraint itself, the optimal solutions satisfy a following formula 5.

$$\lambda = \frac{dF1}{dQ1} = \frac{dF2}{dQ2} = \ldots = \frac{dFn}{dQn} \quad (5)$$

It should be noted that "dF/dQ" represents a fuel consumption in a case that the heat quantity supplied from the heat source is slightly increased. This "dF/dQ" is referred to as a fuel consumption per slightly increased heat (FCIH), hereinafter. The formula 5 indicates that the total fuel consumption is a minimum value when the "FCIH" of each heat source is equal to each other.

Figure 21:
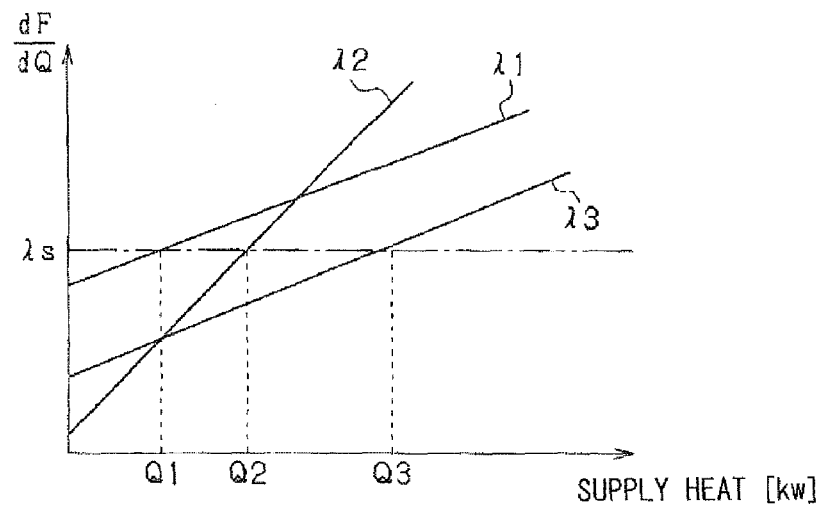
FIG. 21 is a graph showing a relationship between the supplied heat quantity and a fuel consumption per increase heat.

FIG. 21 is a graph showing a relationship between the supplied heat quantity "Q" and the "FCIH". In a case that the "FCIH" of the first to third heat sources have characteristics lines denoted by λ1, λ2, and λ3, since the fuel consumption "F" is expressed by the quadratic function (aQ²+bQ+c) of the heating quantity "Q", a first order differential of this quadratic function is expressed by a linear function (2aQ+b). Such a relationship between "Q" and "FCIH" is referred to as a heat-fuel relationship. The process for computing this heat-fuel relationship corresponds to a heat-fuel relationship computing means.

In FIG. 21, a horizontal line corresponding to a specified "λs" intersects each "FCIH"-line of each heat source. On each intersection, the values of "FCIH" are equal to each other so that the above formula 5 is satisfied. Thus, if a total quantity of the supplied heat quantity "Q1", "Q2", and "Q3" at each intersection is equal to the total required heat quantity "Qall", the above formula 4 is also satisfied. Such intersections are obtained by varying the value of the specified "λs".

Generally, each heat source has an upper limit "Qmax" and a lower limit "Qmin" which each heat source can supply. For this reason, when the "FCIH" is varied to be coincided mutually in each heat source, it is likely that the heat quantity reaches the upper limit "Qmax" or the lower limit "Qmin" in a certain heat source.

In a plurality of heat sources in which the supplied heat quantity does not reach the upper limit "Qmax" nor the lower limit "Qmin", when the "FCIH" of each heat source are identical to each other, the fuel consumption of these heat sources becomes the minimum value. Meanwhile, in the heat sources in which the supplied heat quantity reaches the upper limit "Qmax" or the lower limit "Qmin", although the "FCIH" is not always identical, the fuel consumption of these heat sources becomes the minimum value.

Therefore, with a consideration of the upper limit "Qmax" and the lower limit "Qmin", the optimal solution is expressed by following formulas 6-8.

In a case that $dFi/dQi=\lambda s$, $$Qi\,min \le Qi \le Qi\,max \quad (6)$$

In a case that $dFi/dQi \le \lambda s$, $$Qi = Qi\,max \quad (7)$$

In a case that $dFi/dQi \ge \lambda s$, $$Qi = Qi\,min \quad (8)$$

Figure 22:
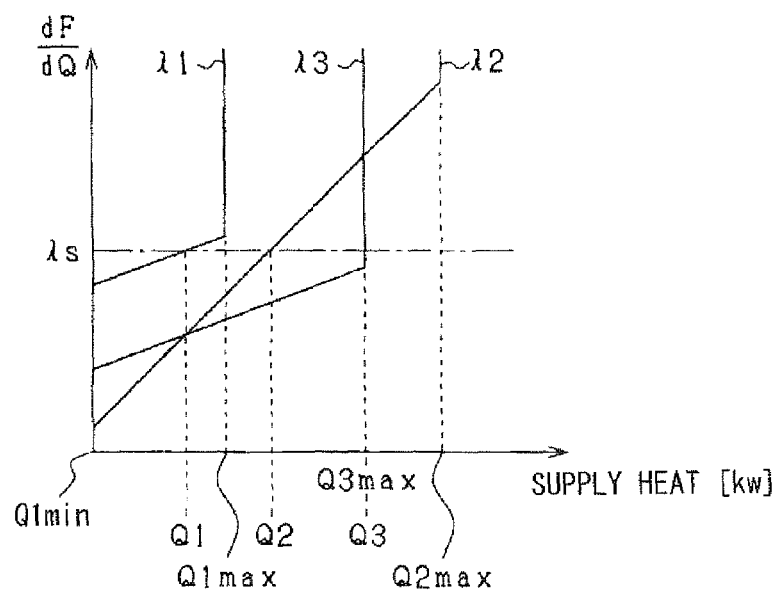
FIG. 22 is a graph showing a relationship between the supplied heat quantity and a fuel consumption per increase heat.

FIG. 22 schematically shows the above formulas 6-8.

That is, when the supplied heat quantity reaches the upper limit "Qmax" or the lower limit "Qmin", the supplied heat quantity is restricted by these limits. Referring to FIG. 22, the heat quantity supplied from each heat source can be obtained according to the heat quantity at the intersections of the characteristics lines $\lambda 1$, $\lambda 2$, and $\lambda 3$ and a horizontal line corresponding to a specified "λs".

The heat quantity "Q1" supplied from the first heat source is between the lower limit "Q1min" (=0) and the upper limit "Q1max".

The heat quantity "Q2" supplied from the second heat source is between the lower limit "Q2min" (=0) and the upper limit "Q2max".

The heat quantity "Q3" supplied from the third heat source corresponds to the upper limit "Q3max".

Then, based on such a heat-fuel relationship, a relationship between the total required heat quantity "Qreq" and the optimum-allocated heat quantity of each heat source is computed. The following description relates to a case where two heat sources exist.

Figure 23:
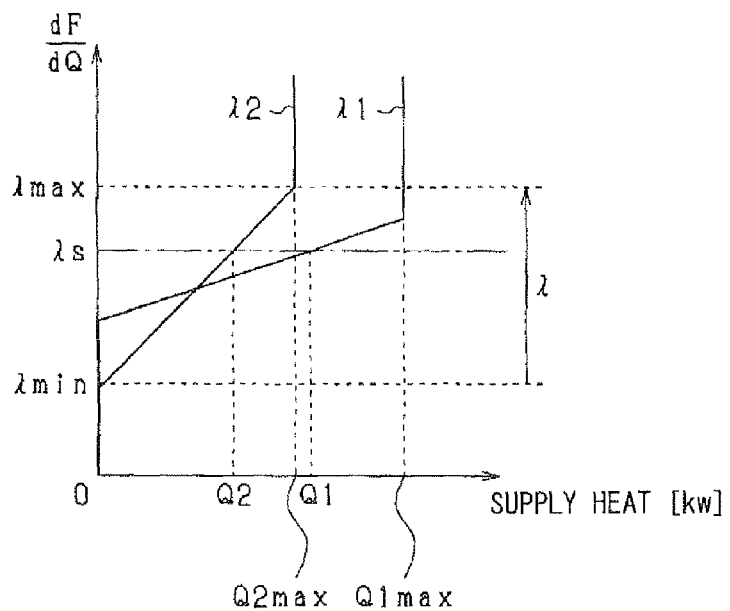
FIG. 23 is a graph showing a relationship between the supplied heat quantity and a fuel consumption per increase heat.

As shown in FIG. 23, the "FCIH" of the first and the second heat source is respectively denoted by "λ1" and "λ2". The heat quantity supplied from the first and the second heat source is optimally allocated, and a total of each supplied heat quantity "Q1" and "Q2" is obtained.

Specifically, in FIG. 23, a horizontal line corresponding to a specified "λs" is moved upward from the minimum "FCIH" (λmin). While moving the horizontal line upward, the supplied heat quantity "Q1" and "Q2" at the intersections of the horizontal line and each characteristic lines are computed. Also, a total of "Q1" and "Q2" is computed. This computation is performed until the "FCIH" becomes the maximum value (λmax). A relationship between the total supplied heat quantity "Q1+Q2" and the optimally allocated heat quantities "Q1", "Q2" is computed.

Figure 24:
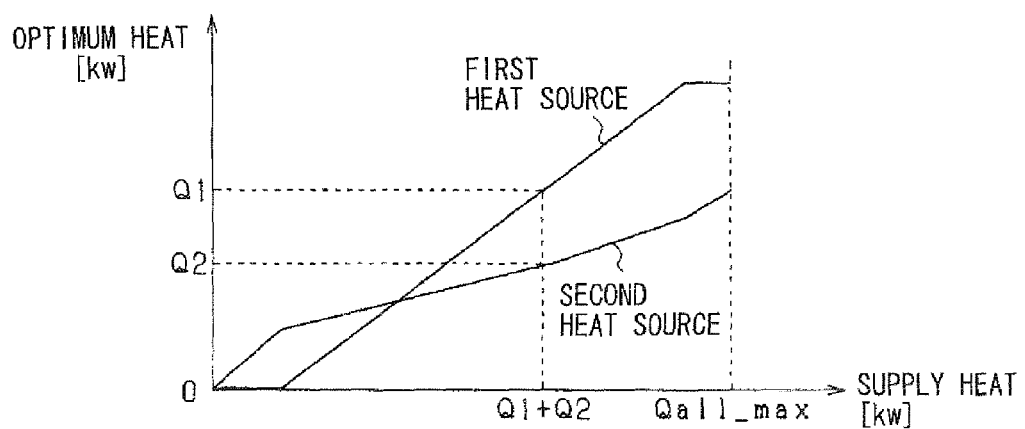
FIG. 24 is a graph showing a relationship between a total supply heat quantity and an optimum allocated heat quantity.

This relationship is shown in FIG. 24.

For example, in a case that the required heat quantity "Qreq" is "Q1+Q2", a point where the total supplied heat quantity is "Q1+Q2" is identified on an axis of abscissas. The corresponding heat quantities "Q1" and "Q2" on an axis of ordinate are read as the optimally allocated heat quantities of the first and the second heat source. Thus, when the required heat quantity "Qreq" is computed, the optimally allocated heat quantities "Q1" and "Q2" of the first and the second heat source can be computed.

Then, the process in step S15 will be described in detail. In this step, a base heat quantity "Qbas(i)" of each heat source (i) is computed with respect to the required heat quantity "Qreq". An additional required heat quantity "Qreq_lef" of each heat source (i) is also computed. Besides, in a case that "i=1", the heat source (1) is an engine coolant, and in a case that "i=2", the heat source (2) is a heat pump.

Figure 25:
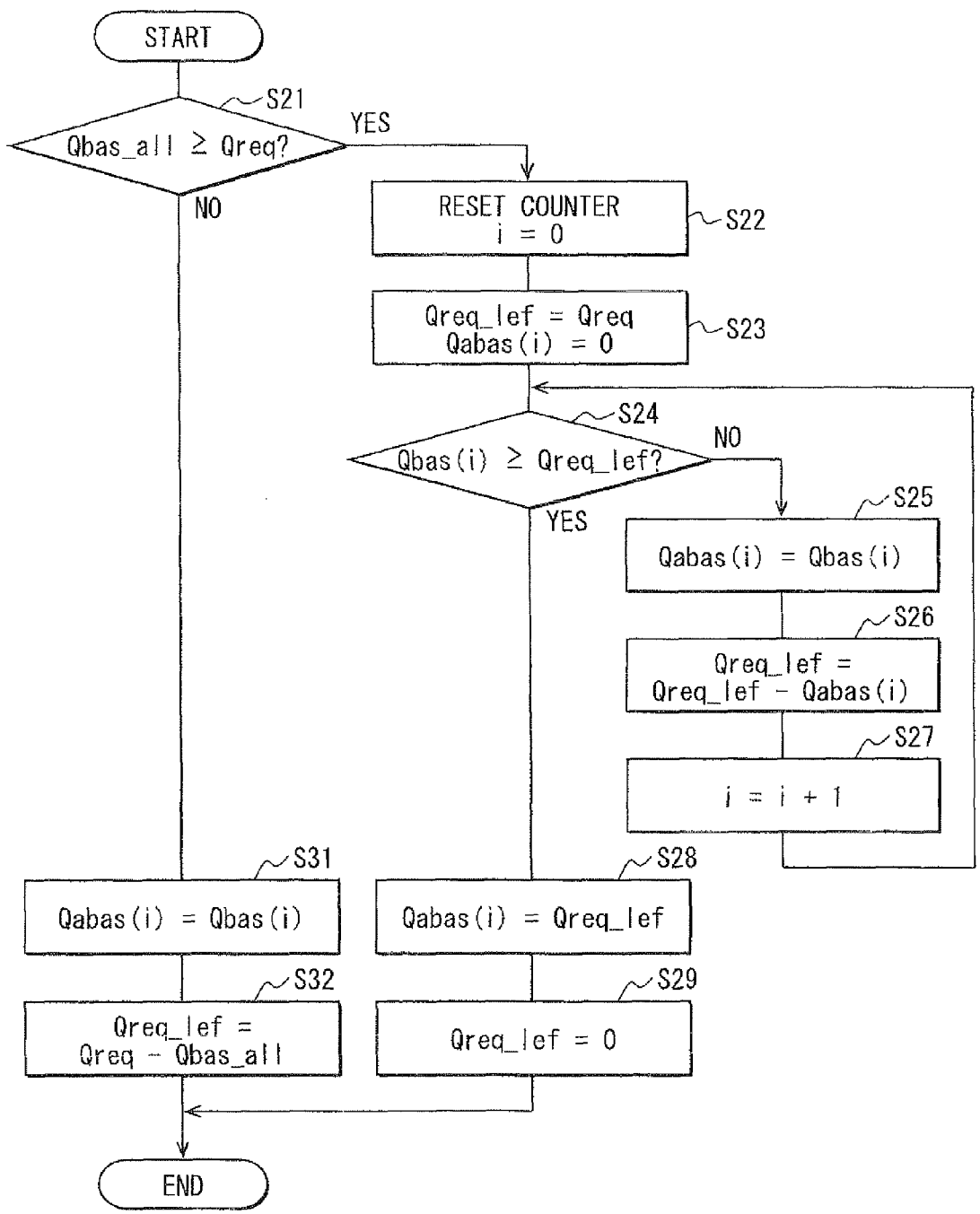
FIG. 25 is a flowchart showing a computing processing of a base heat quantity allocation.

FIG. 25 is a flowchart showing a processing of a base heat quantity allocation.

In step S21, the computer determines whether the total base heat quantity "Qbas_all", which is a summation of the base heat quantity "Qbas(i)" of each heat source (i), is greater than or equal to the required heat quantity "Qreq". That is, the computer determines whether the required heat quantity "Qreq" can be supplied by the total base heat quantity "Qbas_all".

When YES in step S21, the procedure proceeds to step S22 in which a counter "i" is reset. In step S23, the additional required heat quantity "Qreq_lef" is set as the required heat quantity "Qreq", and all of the base heat quantity "Qbas(i)" is set to zero.

In step S24, the computer determines whether the base heat quantity "Qbas(i)" of i-th heat source is greater than or equal to the additional required heat quantity "Qreq_lef". That is, it is determined whether the additional required heat quantity "Qreq_lef" can be supplied by the base heat quantity "Qbas(i)" of the i-th heat source.

When NO in step S24, the procedure proceeds to step S25 in which a required base heat quantity "Qabas(i)" is set as the base heat quantity "Qbas(i)". That is, it is required that the i-th heat source generates the base heat quantity "Qbas(i)".

Then, in step S26, the additional required heat quantity "Qreq_lef" is updated to a value which is obtained by subtracting the required base heat quantity "Qabas(i)" from the additional required heat quantity "Qreq_lef". In step S27, the counter "i" is incremented by "1", The processing from step S24 to S27 is executed repeatedly so that the additional required heat quantity "Qreq_lef" is allocated to the base heat quantity "Qbas(i)" of each heat source (i). When the answer is YES in step S24, the procedure proceeds to step S28 in which the required base heat quantity "Qabas(i)" of the i-th heat source is defined as the additional required heat quantity "Qreq_lef".

The last remaining "Qreq_lef" is allocated to the i-th base heat quantity.

Then, in step S29, the additional required heat quantity "Qreq_lef" is set to zero to end this processing.

When the answer is NO in step S21, the procedure proceeds to step S31 in which the required base heat quantity "Qabas(i)" of all heat sources is defined as the base heat quantity "Qbas(i)". That is, since the required heat quantity "Qreq" can not be supplied by the total base heat quantity "Qbas_all", it is required that all heat source (i) must supply the base heat quantity "Qbas(i)".

Then, in step S32, the additional required heat quantity "Qreq_lef" is updated to a value which is obtained by subtracting the total base heat quantity "Qbas_all" from the additional required heat quantity "Qreq_lef". Then, this processing ends.

Then, a further-required heat quantity "Qapl(i)" is determined with respect to each heat source (i).

If the additional required heat quantity "Qreq_lef" is zero, the further-required heat quantity "Qapl(i)" is set to zero. That is, no additional heat quantity is required other than the base heat quantity "Qbas(i)" with respect to each heat source (i).

Meanwhile, if the additional required heat quantity "Qreq_lef" is not zero, the allocation of the further-require heat quantity "Qapl(i)" is determined with respect to each heat source (i) based on the above mentioned heat-fuel relationship. In an example shown in FIG. 24, the total supplied heat quantity (Q1+Q2) is defined as the additional required heat quantity "Qreq_lef", and the corresponding optimum allocated heat quantity (Q1, Q2) is determined. These optimum allocated heat quantity is defined as the further-required heat quantity "Qapl(i)". Thereby, the heat quantity other than the base heat quantity can be allocated to each heat source (i). The above processing corresponds to a heat allocation determining means.

In step S16, the command heat quantity "Qa(i)" is computed with respect to each heat source (i). The command heat quantity "Qa(i)" corresponds to an summation of the required base heat quantity "Qabas(i)" and the further-required heat quantity "Qapl(i)".

The energy controller 151 transmits a signal indicative of the command heat quantity "Qa(i)" to the air-condition controller 154 and the engine controller 152. The air-condition controller 154 and the engine controller 152 control each heat source (i) so that the command heat quantity "Qa(i)" is supplied. Also, the air-condition controller 154 controls the water pump 122 and the blower fan 124 to supply the command heat quantity "Qa(i)". Further, in the waste-heat-generation control, the heat quantity generated by the engine is also controlled.

The air-condition controller 154 transmits a command signal to the heat pump controller 138 so that the heat pump system supplies the command heat quantity "Qa(2)" to the interior of the vehicle. At the same time, the air-condition controller 154 computes electric-power required for the heat pump system to generate the command heat quantity "Qa(2)".

The processing of the electric-power supply control will be described in detail.

The electricity-fuel rate is computed in step S41, and the base electric-power of each electric-power source is computed in step S42.

The computer computes an increased torque $\Delta Te$ of the engine which is required for the generator 141 to generate electric-power "P". Also the increased fuel quantity $\Delta F$ necessary for generating the increased torque $\Delta Te$ is computed. The electricity-fuel rate of the generator 141 is obtained by dividing the increased fuel quantity $\Delta F$ by the electric-power "P".

This increased torque $\Delta Te$ can be computed based on a generated electric-power, a generation efficiency of the generator 141, and the engine speed. The increased fuel quantity $\Delta F$ can be computed as a variation in the fuel consumption (for example, variation from point "Y" to "YY" in FIG. 18). When decelerating the vehicle, the generator 141 performs a regenerative power generation by a rotational force transmitted to the engine 110 from the wheels 115 through a transmission 112. Thus, when the regenerative power generation is performed by the generator 141, the electricity-fuel rate of the generator 141 is zero and the base electric-power is defined as a maximum regenerative electric-power. When no regenerative power generation is performed, the base electric-power is zero.

Since the EWH-generator 125 generates electricity by use of heat of the engine coolant, an increased fuel quantity due to an increase in engine friction loss corresponds to a fuel consumption in a case that the engine coolant temperature is decreased along with the electricity generation.

Figure 27:
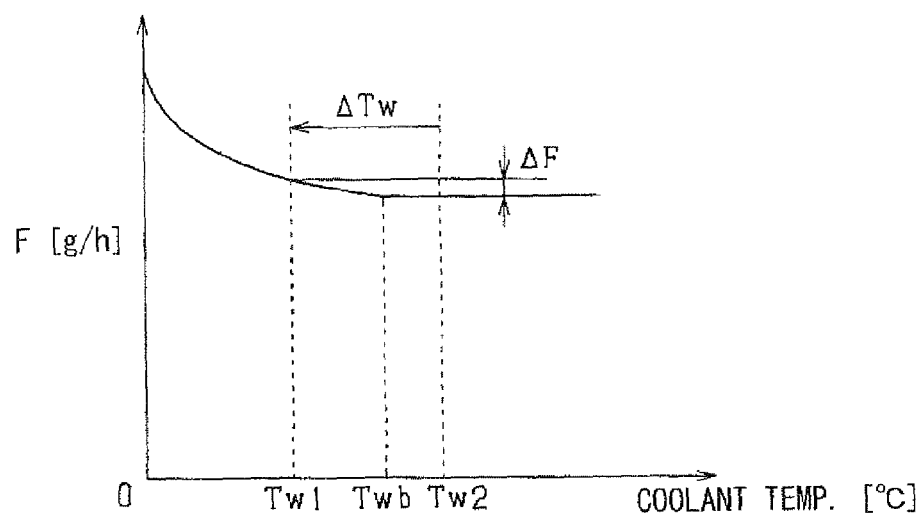
FIG. 27 is a graph showing a relationship between a coolant temperature and a fuel consumption.

FIG. 27 shows a relationship between the engine coolant temperature and the fuel consumption. This relationship can be computed based on an experiment.

As shown in the FIG. 27, in a case that the engine coolant temperature is higher than a base temperature "Twb", the fuel consumption "F" is constant.

Meanwhile, as the coolant temperature becomes lower than the base temperature "Twb", the fuel consumption is also increased due to an increase in friction loss of the engine 110. Thus, when the current coolant temperature is decreased from "Tw2" to "Tw1" by $\Delta Tw$, the fuel consumption is increased by $\Delta F$. That is, the fuel is consumed by $\Delta F$ due to the electric-power generation utilizing the waste heat.

Thus, the electricity-fuel rate of the EWH-generator 125 can be computed based on a relationship between $\Delta Tw$ and $\Delta F$. The decreased coolant temperature $\Delta Tw$ can be computed based on electric-power generated by the EWH-generator 125, a generation efficiency of the generator 125, and a thermal capacity of the engine coolant.

Figure 28:
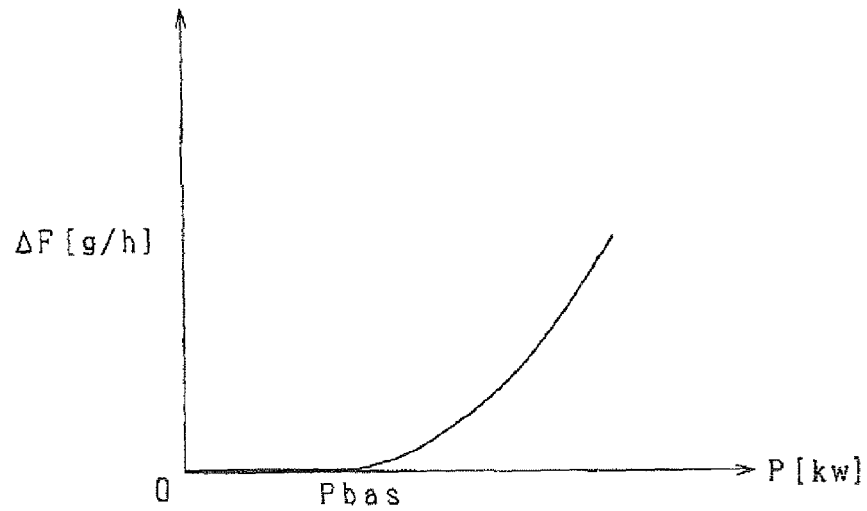
FIG. 28 is a graph showing a relationship between a waste-heat generating electric-power and a fuel increase quantity.

FIG. 28 shows a relationship between a waste-heat electric-power "P" generated by the EWH-generator 125 and the increased fuel quantity $\Delta F$ which is consumed for generating the waste-heat electric-power "P".

When the waste-heat electric-power "P" is less than a base electric-power "Pbas", the increased fuel quantity $\Delta F$ is zero. This base electric-power "Pbas" corresponds to the base temperature "Twb" shown in FIG. 27. When the waste-heat electric-power "P" is less than the base electric-power "Pbas", the coolant temperature does not drop lower than the base temperature "Twb". When the waste-heat electric-power "P" exceeds the base electric-power "Pbas", the coolant temperature drops lower than the base temperature "Twb" and the increased fuel quantity $\Delta F$ becomes larger.

Based on the electric-power "P" generated by the EWH-generator 125 and its fuel consumption, the electricity-fuel rate of the EWH-generator 125 is computed. Specifically, the electricity-fuel rate is obtained by dividing the increased fuel quantity $\Delta F$ by a difference between the waste-heat electric-power "P" and the base electric-power "Pbas". Then, regarding the EWH-generator 125, an electricity-fuel rate characteristic chart is established.

A total base electric-power "Pbas_all" is computed by totalizing each base electric-power of each electric-power source. The electricity-fuel rate of the battery 143 will be described later. The base electric-power of the battery 143 is zero.

A processing of the optimization computation in step 43 will be described in detail. The process is almost the same as the processing of computing the above heat quantity. With respect to the electric-power "P", a fuel consumption per increase electric power (FCIE) dF/dP, and an electricity-fuel relationship, an optimal solution is obtained by Lagrange's method of undetermined multipliers. This processing corresponds to an electricity-fuel computing means.

Comparing with the computation processing of the heat quantity, following points are different therefrom.

First, with respect to a plurality of electric-power sources except the battery 143, for example, the EWH-generator 125 and the generator 141, an optimum load allocation of each heat source is determined. This processing corresponds to an electric-power allocation determining means. The energy controller 151 computes an electricity-fuel relationship of each electric-power source according to a driving condition of the engine 110.

Then, a total fuel consumption consumed in each electric-power source except battery 143 is divided by the required electric-power to obtain an optimal electricity-fuel rate. The fuel consumption required to generate electric-power in each electric-power source except the battery 143 is expressed by a function of the electric-power. Its differentiation value is computed as the fuel consumption per increase electric-power (FCIE).

That is, in a case that the fuel consumption is made minimum, the "FCIE" is computed with respect to total electric-power sources except the battery 143. Then, the electricity-fuel relationship is computed.

Regarding the battery 143, a fuel consumption necessary for charging the battery 143 is consumed as the fuel consumption to generate the electric-power. Thus, in the battery 143, the "FCIE" is not varied relative to the supplied electric-power. In other words, the battery 143 can vary its supplying electric-power without changing the "FCIE".

The fuel consumption for charging the battery 143 is computed based on the electric-power which the generator 141 and the EWH-generator 125 supply and their electricity-fuel rates. Since the "FCIE" of the battery 143 does not vary with respect to the supply electric-power, the "FCIE" of the battery 143 is equal to the electricity-fuel rate.

Figure 29:
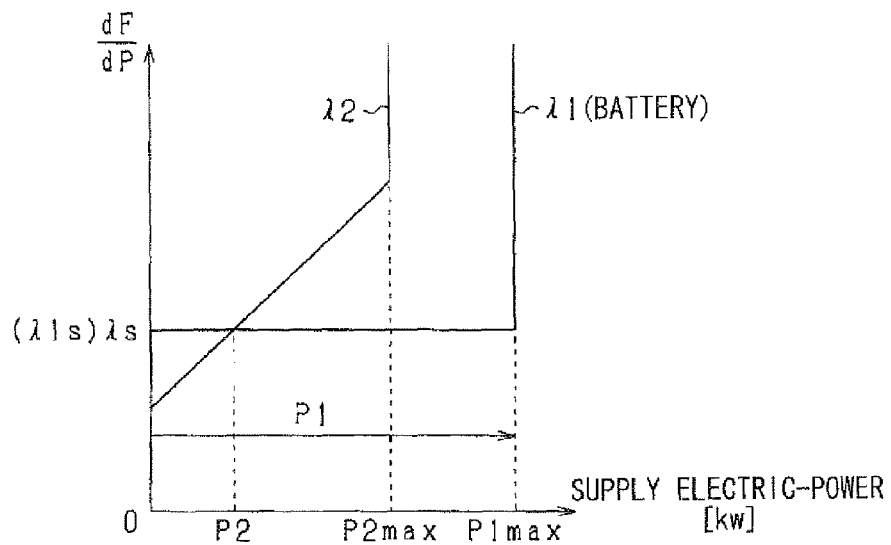
FIG. 29 is a graph showing a relationship between the supplied electric-power and a fuel consumption per increase electric-power.

FIG. 29 shows a relationship between the supply electric-power "P" and the "FCIE" with respect to a first electric-power source (battery 143) and a second electric-power source (total electric-power source). Based on this relationship, a relationship between a total supply electric-power and each electric-power (optimum-allocation electric-power) is computed.

As shown in FIG. 29, the "FCIE" of the first and the second electric-power source is respectively denoted by "$\lambda 1$" and "$\lambda 2$". The heat quantity supplied from the first and the second electric-power source is optimally allocated, and a total of each supplied electric-power "P1" and "P2" is obtained.

Since the "FCIE($\lambda 1$)" of the battery 143 is a constant value "$\lambda 1s$", the "FCIE" of the first electric-power source agrees with the "FCIE" of the second electric-power source when a specified "$\lambda s$" coincides with a constant value "$\lambda 1s$". Thus, when the specified "$\lambda s$" is less than the constant value "$\lambda 1s$", the supplied electric-power "P2" of the second electric-power source is obtained from an intersection of lines "$\lambda 1$" and "$\lambda 2$". The supplied electric power "P1" of the first electric-power source is zero. When the specified "$\lambda s$" agrees with the constant value "$\lambda 1s$", the electric-power "P2" becomes constant and the electric-power "P1" increases. After the electric-power "P1" reaches the upper limit "P1max", the electric-power "P1" becomes constant at "P1max". The electric-power "P2" is obtained from the intersection of the line $\lambda 2$ and the line $\lambda s$.

Figure 30:
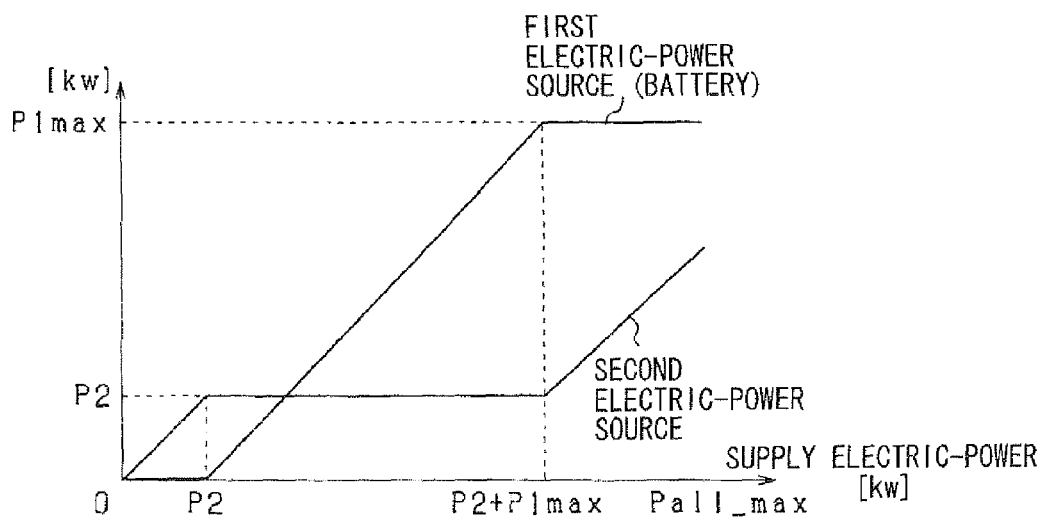
FIG. 30 is a graph showing a relationship between a total supply electric-power and an optimum allocated electric-power.

Each of the electric-power "P1" and "P2" is obtained, and its total of "P1" and "P2" is computed. This relationship is shown in FIG. 30. Referring to FIG. 30, the required electric-power "Preq" is identified on axis of abscissas, and corresponding optimum-allocated electric-powers "P1" and "P2" are identified on axis of ordinate. Thus, when the required electric-power "Preq" is computed, the optimum-allocated electric-powers "P1" and "P2" of the first and the second electric-power source can be computed. As a result, the optimum-allocated electric-powers of the electric-power source including the battery 143 can be computed. This processing corresponds to an electric-power allocation determining means.

Then, in step S44, based on the optimum-allocated electric-power, the heat-fuel ratio of the heat pump 30 is computed. The processings in steps S44 and S12 are simultaneously executed.

In step S45, the energy controller 151 receives a signal indicative of electric-power which the heat pump system 130 requires. This signal is transmitted from the air-condition controller 154. Further, the energy controller 151 receives signals indicative of electric-power which the other electric loads (the load 142, the electric pump 122, and the inverter 132) require, and computes a load required electric-power "Preq" based on these signals.

In step S46, the energy controller 151 computes a charge-required electric-power "Preqc" which is required for charging the battery 143. This processing will be described in detail.

Figure 31:
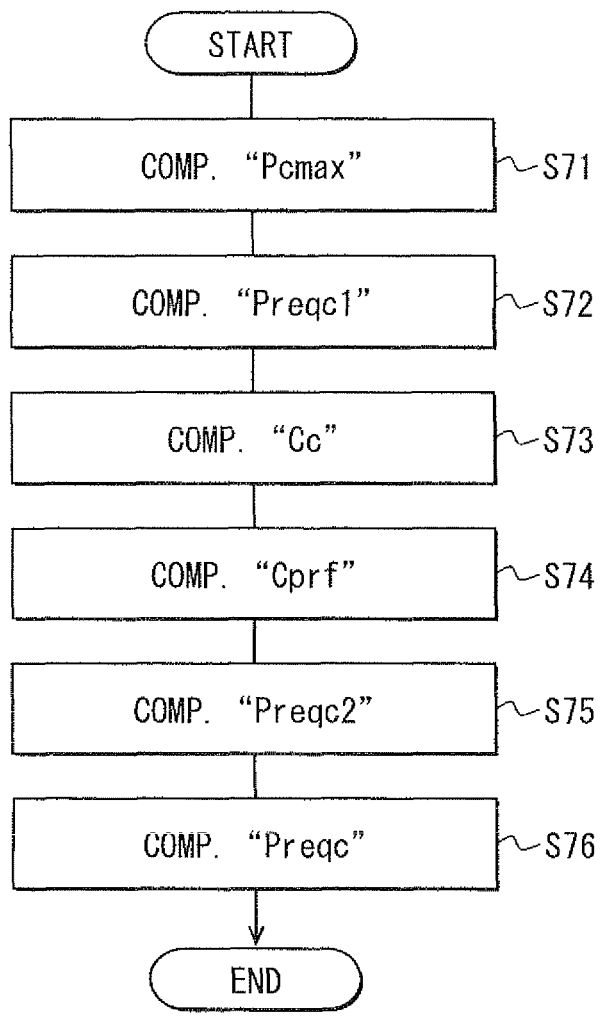
FIG. 31 is a flowchart showing a computing processing of a charge-required electric-power.

FIG. 31 is a flowchart showing a processing for computing the charge-required electric-power "Preqc". This processing is executed by the energy controller 151.

In step S71, an upper limit "Pcmax" of electric-power charged to the battery 143 is computed. This upper limit "Pcmax" depends on a current battery condition, such as battery temperature. It should be noted that the upper limit "Pcmax" is set to zero when the capacity of the battery 143 is greater than a specified value and no more charging can not be conducted.

In step S72, a charge-required electric-power "Preqc1" relative to the total base electric-power "Pbas_all" is computed. When the load-required electric-power "Preq" is greater than the total base electric-power "Pbas_all", the charge-required electric-power "Preqc1" is set to zero. An additional load-required electric-power "Preq_lef" is defined by subtracting the total base electric-power "Pbas_all" from the load-required electric-power "Preq". That is, since all of the total base electric-power "Pbas_all" is allocated to the load-required electric-power "Preq", the charge-required electric-power "Preqc1" relative to the total base electric-power "Pbas_all" is set to zero.

Meanwhile, when the load-required electric-power "Preq" is less than the total base electric-power "Pbas_all", the charge-required electric-power "Preqc1" is defined by subtracting the load-required electric-power "Preq" from the total base electric-power "Pbas_all". The additional load-required electric-power "Preq_lef" is set to zero.

Then, in step S73, a charge electricity-fuel rate "Cc" representing a fuel consumption required for charging the battery 143 by unit electric-power is computed. The fuel consumption for charging the battery 143 can be expressed by an increase quantity $\Delta Fc$ of total fuel consumption and can be expressed as a function of the charging electric-power "Pc".

The charge electricity-fuel rate "Cc" is obtained by dividing the increase quantity $\Delta Fc$ by the charging electric-power "Pc". The maximum electric-power which all electric-power sources can supply other than the base electric-power does not exceeds "Preq_lef+Pc". The total of the charging electric-power "Pc" and the charge-required electric-power "Preqc" does not exceed the upper limit "Pcmax".

Figure 32:
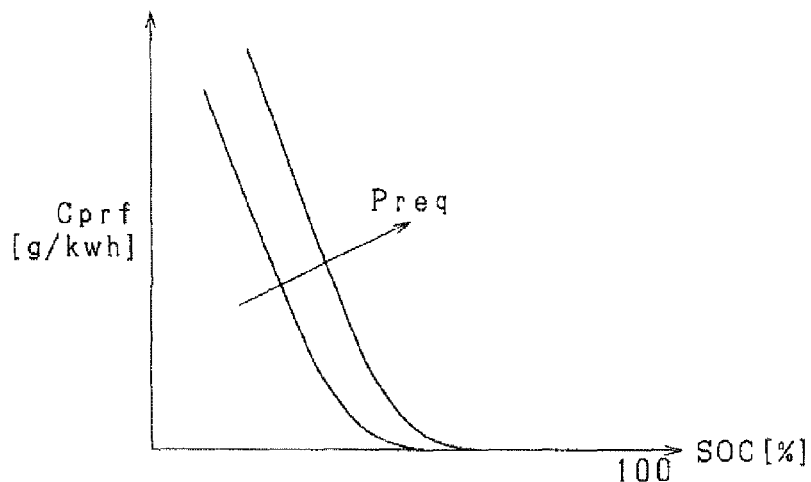
FIG. 32 is a map showing a relationship between a remaining battery charge, a load-required electric-power and a reference electricity-fuel rate.

In step S74, a reference electricity-fuel rate "Cprf" is computed, which is a reference for determining whether the battery 143 should be charge or not. As shown in FIG. 32, this reference electricity-fuel rate "Cprf" increases as the remaining battery charge becomes smaller. Also, this reference electricity-fuel rate "Cprf" increases as the load-required electric-power "Preq" becomes larger.

Figure 33:
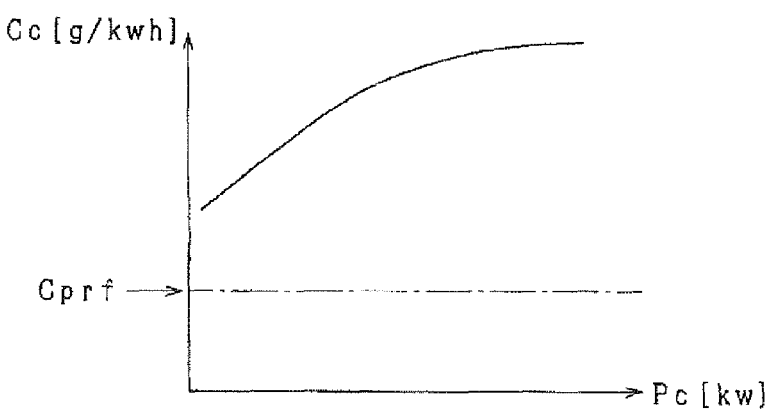
FIG. 33 is a graph showing a relationship between a charge electric-power, a charge electricity-fuel rate and a reference electricity-fuel rate.

In step S75, a charge-required electric-power "Preqc2" relative to other than the total base electric-power "Pbas_all" is computed. As shown in FIG. 33, when the charge electricity-fuel rate "Cc" is always larger than the reference electricity-fuel rate "Cprf", the battery 143 is not charged.

Figure 34:
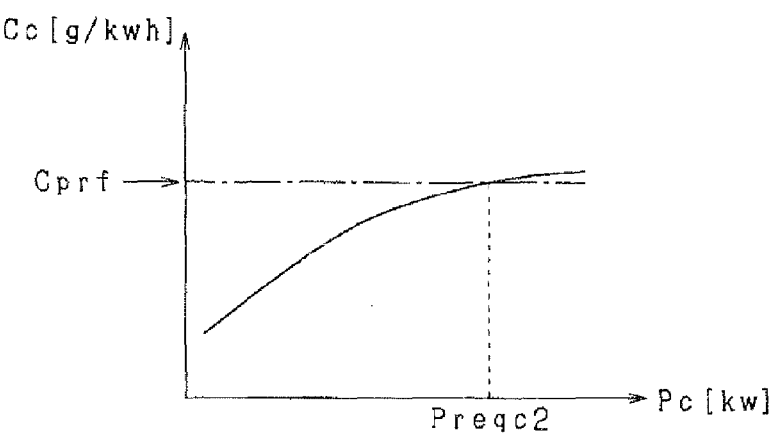
FIG. 34 is a graph showing a relationship between a charge electric-power, a charge electricity-fuel rate and a reference electricity-fuel rate.

Meanwhile, as shown in FIG. 34, when the charge electricity-fuel rate "Cc" is smaller than the reference electricity-fuel rate "Cprf", its maximum charging electric-power "Pc" is defined as the charge-required electric-power "Preqc2" relative to other than the total base electric-power "Pbas_all".

In step S76, the charge-required electric-powers "Preqc1" and "Preqc2" are totalized to obtain the charge-required electric-power "Preqc". When the charge-required electric-power "Preqc" exceeds the upper limit "Pcmax", the charge-required electric-power "Preqc" is defined as the upper limit "Pcmax". Then, the processing is terminated. The above processing corresponds to a charge-required electric-power computing means.

Then, a process in step S47 will be described in detail. In this step, the base electric-power "Pbas(i)" of each electric-power source (i) is allocated with respect to the total required electric-power "Preqa". The additional required electric-power "Preqa_lef" is allocated to each electric-power source (i).

Figure 35:
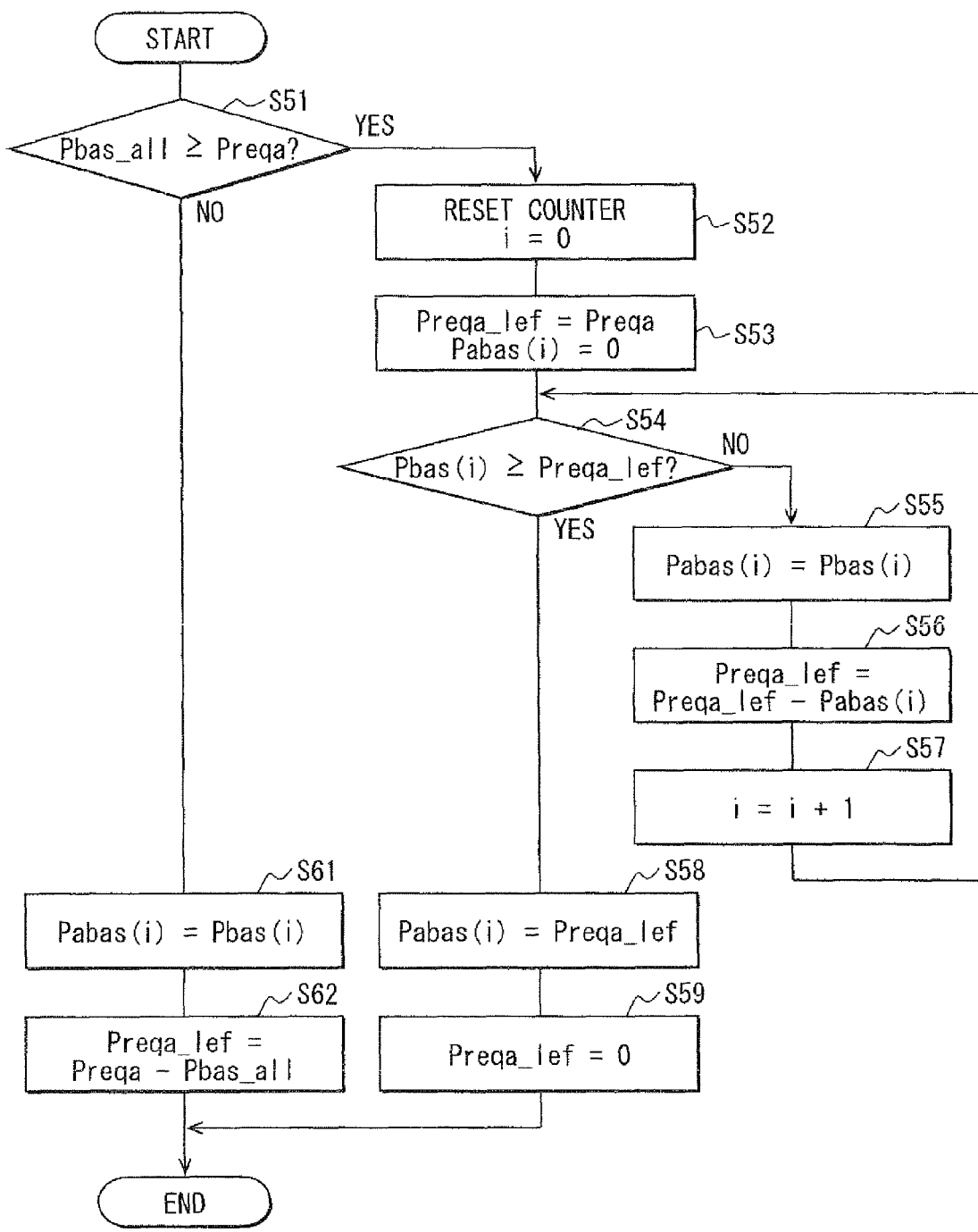
FIG. 35 is a flowchart showing a computing processing of a base electric-power allocation.

FIG. 35 is a flowchart showing a processing of a base electric-power allocation. Basically, this processing is almost the same as the processing of the base heat quantity allocation.

In step S51, the computer determines whether the total base electric-power "Pbase_all", which is a summation of the base electric-power "Pbas(i)" of each electric-power source (i), is greater than or equal to the total required electric-power "Preqa".

When YES in step S51, the procedure proceeds to step S52 in which a counter "i" is reset. In step S53, the additional required electric-power "Preqa_lef" is defined as the total required electric-power "Preqa", and all of the base electric-power "Pbas(i)" is set to zero.

In step S54, the computer determines whether the base electric-power "Pbas(i)" of i-th heat source is greater than or equal to the additional required electric-power "Preqa_lef".

When NO in step S54, the procedure proceeds to step S55 in which a required base electric-power "Pabas(i)" is set as the base electric-power "Pbas(i)".

Then, in step S56, the additional required electric-power "Preqa_lef" is updated to a value which is obtained by subtracting the base electric-power "Pbas(i)" from the additional required electric-power "Preqa_lef". In step S57, the counter "i" is incremented by "1".

The processing from step S54 to S57 is executed repeatedly so that the additional required electric-power "Preqa_lef" is allocated to the base electric-power "Pbas(i)" of each electric-power source (i). When the answer is YES in step S54, the procedure proceeds to step S58 in which the required base electric-power "Pabas(i)" of the i-th electric-power source is defined as the additional required electric-power "Preqa_lef".

Then, in step S59, the additional required electric-power "Preqa_lef" is set to zero to end this processing.

When the answer is NO in step S51, the procedure proceeds to step S61 in which the required base electric-power "Qabas(i)" of all electric-power source (i) is defined as the base electric-power "Pbas(i)".

Then, in step S62, the additional required electric-power "Preqa_lef" is updated to a value which is obtained by subtracting the total base electric-power "Pbas_all" from the additional required electric-power "Preqa_lef". Then, this processing ends.

Then, a further-required electric-power "Papl(i)" is determined with respect to each electric-power source (i).

If the additional required electric-power "Preqa_lef" is zero, the further-required electric-power "Papl(i)" is set to zero.

Meanwhile, if the additional required electric-power "Preqa_lef" is not zero, the allocation of the further-require electric-power "Papl(i)" is determined with respect to each electric-power source (i) based on the above mentioned electricity-fuel relationship.

When the charge-required electric-power "Preqc" is zero, the electric-power is supplied also from the battery 143. Specifically, based on the optimal load allocation between each electric-power source computed in step S43, each of the electric-power supplied from the battery 143 and the other electric-power sources is determined. Furthermore, based on the optimal load allocation between the EWH-generator 125 and the generator 141, each of the electric-power supplied from the EWH-generator 125 and the generator 141 is determined. Each of these is referred to as the further-required electric-power "Papl(1)" and "Papl(2)".

When the charge-required electric-power "Preqc" is not zero, the battery 143 is charged.

Thereby, the electric-power other than the base electric-power can be allocated to each electric-power source (i).

In step S48, the command electric-power "Pa(i)" is computed with respect to each electric-power source (i). The command electric-power "Pa(i)" corresponds to an summation of the required base electric-power "Pabas(i)" and the further-required electric-power "Papl(i)".

The energy controller 151 transmits a signal indicative of the command electric-power "Pa(i)" to an generator controller 153 which controls each electric-power source (i) so that the command electric-power "Pa(i)" is supplied.

Then, in step S49, the energy controller 151 updates the electricity-fuel rate of the battery 143 based on the charge-required electric-power "Preqc" and the fuel consumption at this time. That is, a total fuel consumption is computed, which corresponds to a summation of the fuel quantity which has consumed for charging the battery 143 and the fuel quantity which is currently consumed. The fuel quantity consumed for currently charging the battery 143 is obtained based on a relationship between the charge electric-power "Pc" and the charge electricity-fuel rate "Cc". The electric-power which has been supplied for charging the battery 143 and the currently supplied electric-power are added together to obtain a total electric power. The total fuel consumption is divided by the total electric-power to compute the electricity-fuel rate of the battery 143.

According to the above embodiment, following advantages can be obtained.

The required heat quantity "Qreq" which the heat sources (engine coolant, heat pump system 130) supply to the heat exchangers (heater core 123, interior heat exchanger 137) is computed. Further, a relationship between the supply heat quantity and the heat-fuel rate "Ct" is computed with respect to each heat source (i).

The allocation of heat quantity which each heat source (i) supplies is determined based on the relationship between the supply heat quantity and the heat-fuel rate "Ct" in such a manner that the total heat quantity agrees with the required heat quantity "Qreq" and the heat-fuel rate "Ct" becomes a minimum value. Thus, the required heat quantity "Qreq" can be supplied to the heat exchanging portions from the heat sources while the fuel consumption can be restricted as much as possible.

The fuel consumption per increase heat (dF/dQ) is computed with respect to each heat source (i). When the fuel consumptions per increase heat of each heat source (i) agree with each other, the consuming fuel quantity can not be decreased any more. Thus, the allocation of heat quantity of each heat source (i) is determined in such a manner as to establish such a situation, whereby the total fuel consumption "f" can be made minimum.

The allocation of heat quantity which each heat source (i) supplies is determined in such a manner that the total heat quantity agrees with the required heat quantity "Qreq" and the fuel consumptions per increase heat of each heat source (i) agrees with each other. Thus, the required heat quantity "Qreq" can be supplied to the heat exchanging portions from the heat sources while the total fuel consumption "f" can be made minimum. Furthermore, an increase in computing load can be restricted.

Regarding each heat source (i), a relationship between the heat quantity "Q" and the fuel consumption per increase heat "FCIH" is computed. For this reason, when the "FCIH" is varied to be coincided mutually in each heat source (i), the heat quantity "Qi" corresponding to the "FCIH" can be computed based on the heat-fuel relationship of each heat source (i).

Since the allocation of heat supplied from each heat source (i) is determined so that the total of the heat quantity "Qi" agrees with the required heat quantity "Qreq", the total fuel consumption "f" can be made minimum while restricting an increase in the computing load.

Regarding each heat source (i), the upper limit "Qimax" of the heat quantity "Qi" is established and the heat quantity "Qi" corresponding to the "FCIH" is computed while the "FCIH" of each heat source (i) agrees with each other to be increased. When the heat quantity "Qi" reaches the upper limit "Qimax", the allocation of the heat quantity supplied from each heat source (j) is determined so that the fuel quantity "Fj(Qj)" consumed by the heat source (j) becomes minimum.

That is, in the heat source (j) where the supply heat quantity "Qj" does not reach the upper limit, the "FCIH" of each heat source (j) agrees with each other to be increased. Then, the allocation of heat quantities "Qi" and "Qj" supplied from the heat source (i) and the heat source (j) is determined so that the total of "Qi" and "Qj" agrees with the required heat quantity "Qreq". Thus, the fuel quantity "Fj(Qj)" consumed by the heat source (j) is made minimum, whereby the total fuel consumption "f" can be made minimum.

The above heat-fuel relationship in each heat source (i) is computed according to a driving condition of the engine 110. The heat quantity "Qi" supplied from each heat source (i) is appropriately allocated according to the driving condition of the engine 110.

Based on the computed heat quantity, a discharge quantity of the electric motor 22 is controlled, so that the heat quantity supplied to the heater core 123 is appropriately controlled.

The multiple heat sources include the heat pump system 130. The heat-fuel rate "Ct" of the heat pump system 130 is computed based on the electricity-fuel rate "Cp". Based on this heat-fuel rate "Ct" of the heat pump system 130, the allocation of the heat which each heat source (i) supplies can be determined.

The vehicle is equipped with a plurality of electric-power sources (generator 141, EWH-generator 125). The load-required electric-power "Preq" which is supplied to the electric loads including the heat pump system 130 is computed. Further, with respect to each electric-power source (i), a relationship between the supply electric-power "Pi" and the electricity-fuel rate "Cp" is computed.

Based on this relationship, the allocation of electric-power "Pi" which each electric-power source (i) supplies is determined in such a manner that the total electric-power supplied from all electric-power sources agrees with the load-required electric-power "Preq" and the fuel consumption for supplying "Preq" becomes minimum. Thus, the load-required electric-power "Preq" can be supplied to the electric load including the heat pump system 130 from the electric-power sources, while the total fuel consumption "f" can be made minimum.

Further, with respect to the heat pump system 130, the heat-fuel rate "Ct" is computed based on the minimum electricity-fuel rate. Thus, after the allocation of electric-power supplied from each electric-power source, the heat-fuel rate "Ct" of the heat pump system 130 can computed. Thereby, the total fuel consumption "f" can be made minimum.

The fuel consumption per increase electric-power (dF/dP) is computed with respect to each electric-power source (i). The allocation of electric-power which each electric-power source supplies is determined in such a manner that the total electric-power agrees with the load-required electric-power "Preq" and the fuel consumptions per increase electric-power of each electric-power source (i) agrees with each other. Thus, the load-required electric-power "Preq" can be supplied to the electric load including the heat pump system 130 from the electric-power sources, while the total fuel consumption "f" can be made minimum. Furthermore, an increase in computing load can be restricted.

Regarding each electric-power source (i), a relationship between the electric power "Pi" and the fuel consumption per increase electric-power "FCIE" is computed. For this reason, when the "FCIE" is varied to be coincided mutually in each electric-power source (i), the electric-power "Pi" corresponding to the "FCIE" can be computed based on the electricity-fuel relationship of each electric-power source (i).

Since the allocation of electric-power supplied from each electric-power source (i) is determined so that the total of the electric-power "Pi" agrees with the load-required electric-power "Preq", the total fuel consumption "f" can be made minimum while restricting an increase in the computing load.

Regarding each electric-power source (i), the upper limit "Pimax" of the electric-power "Pi" is established and the electric-power "Pi" corresponding to the "FCIE" is computed while the "FCIE" of each electric-power source (j) agrees with each other to be increased. When the electric-power "Pi" reaches the upper limit "Pimax", the allocation of the electric-power "Pj" supplied from electric-power source (j) is determined so that the fuel quantity "Fj(Pj)" consumed by the electric-power source (j) becomes minimum.

That is, in the heat source (j) where the supply electric-power "Pj" does not reach the upper limit, the "FCIE" of each electric-power source (j) agrees with each other to be increased. Then, the allocation of electric-power "Pi" and "Pj" supplied from the electric-power source (i) and the electric-power source (j) is determined so that the total of "Pi" and "Pj" agrees with the load-required electric-power "Preq". Thus, the fuel quantity "Fj(Pj)" consumed by the electric-power source (j) is made minimum, whereby the total fuel consumption "f" can be made minimum.

A plurality of the electric-power source includes the battery 143 of which the "FCIE" is defined as a constant value "$\lambda 1s$". Then, each "FCIE" of electric-power source (i) is set to the constant value "$\lambda 1s$", and the electric-power "Pi" corresponding to the "FCIE" can be computed based on the electricity-fuel relationship of each electric-power source (i). In the electric-power source "k" other than the battery 143, when the "FCIE" is set to the constant value "$\lambda 1s$", the electric-power corresponding to the "FCIE" is a specified fixed value.

The electric-power "P1" which the battery 143 supplies is determined so that the total of the "P1" and "P2" supplied from the other electric-power source "k" agrees with the load-required electric-power "Preq". Thus, in a case the electric-power is supplied from the battery 143 and the other electric-power source "k", the load-required electric-power "Preq" can be supplied to the electric load including the heat pump system 130, while the total fuel consumption "f" can be made minimum.

The vehicle is provided with a plurality of electric-power sources including the battery 143. The load-required electric-power "Preq" is computed to be supplied to the electric loads including the heat pump system 130. Further, the charge-required electric-power "Preqc" is computed, which is required for charging the battery 143. With respect to each electric-power source (i), a relationship between the supply electric-power "Pi" and the electricity-fuel rate "Cp" is computed.

Based on this relationship, the allocation of electric-power which the electric-power source "k" except the battery 143 supplies is determined in such a manner that the total electric-power supplied from the electric-power source "k" agrees with the total required electric-power "Preqa" which corresponds to a total of the load-required electric-power "Preq" and the charge-required electric-power "Preqc" and the electricity-fuel rate "Cp" becomes minimum. Thus, the total required electric-power "Preqa" including an electric-power for charging the battery 143 can be supplied, while the total fuel consumption "f" which the electric-power sources except the battery 143 consume can be made minimum.

The fuel consumption per increase electric-power "FCIE" is computed with respect to each electric-power source "k" except the battery 143. The allocation of electric-power "Pk" supplied from each electric-power source "k" is determined so that the "FCIE" of each electric-power source "k" agrees with each other. The total fuel quantity consumed by the electric-power source except the battery 143 can be made minimum. Furthermore, an increase in computing load can be restricted.

Regarding each electric-power source (i), a relationship between the electric power "Pi" and the fuel consumption per increase electric-power "FCIE" is computed. For this reason, when the "FCIE" is varied to be coincided mutually in each electric-power source (k), the electric-power "Pk" corresponding to the "FCIE" can be computed based on the electricity-fuel relationship of each electric-power source (k) except the battery 143.

Since the allocation of electric-power supplied from each electric-power source (k) is determined so that the total of the electric-power "Pk" agrees with the total required electric-power "Preqa", the total fuel quantity consumed by the electric-power source except the battery 143 can be made minimum while restricting an increase in the computing load.

Regarding each heat source (i), the upper limit "Pimax" of the electric-power "Pi" is established and the electric-power "Pk" corresponding to the "FCIE" is computed while the "FCIH" of each heat source "k" agrees with each other to be increased. When the electric-power "Pk" reaches the upper limit "Pkmax", the allocation of the electric-power supplied from the electric-power source (k) except the battery 143 is determined so that the fuel quantity "Fl(Pl)" consumed by the other electric-power source (l) becomes minimum.

That is, in the electric-power source (l) where the supply electric-power "Pl" does not reach the upper limit, the "FCIE" of each electric-power source (l) agrees with each other to be increased. Then, the allocation of electric-power supplied from the electric-power source (k) except the battery 143 is determined so that the total of "Pl" and "Pk" agrees with the total required electric-power "Preqa". Thus, the fuel quantity "Fl(Pl)" consumed by the electric-power source (l) where the electric-power "Pl" does not reach the upper limit "Plmax" is made minimum, whereby the total fuel consumption "f" which the electric-power sources except the battery 143 consume can be made minimum.

When the electric-power "Pk" is supplied from the electric-power source (k) except the battery 143 and the battery 143 is charged, the charge electricity-fuel rate "Cc" is computed.

Since the charge-required electric-power "Preqc" is computed in a range where the charge electricity-fuel rate "Cc" is less than the reference electricity-fuel rate "Cprf", the battery 143 can be charged in a condition where the total fuel consumption "f" is less than a reference value. Furthermore, since the maximum electric-power is defined as the charge-required electric-power "Preqc" in a range where the charge electricity-fuel rate "Cc" is less than the reference electricity-fuel rate "Cprf", the battery 143 can be charged efficiently. Consequently, the total fuel consumption which the electric-power sources consume can be reduced.

The total fuel consumption consumed in each electric-power source (k) except battery 143 is divided by the total required electric-power "Preqa" to obtain an optimal electricity-fuel rate. And based on electric-power and the optimal electricity-fuel rate, the power source except the battery 143 is totaled as the one power source. The fuel consumption "F2(P2)" for supplying the electric power "P2" is computed as the "FCIE". That is, in a case that the fuel consumption "F2(P2)" is made minimum, the "FCIE" is computed with respect to the total electric-power sources except the battery 143.

Then, the electricity-fuel relationship between the electric-power "P2" and the "FCIE" is computed. The "FCIE" of the battery with respect to the electric-power "P1" is made a constant value. When the "FCIE" is set to the constant value, the electric-power "P2" corresponding to the "FCIE" is a specified fixed value. Meanwhile, the battery 143 varies the supply electric-power "P1".

When the charge-required electric-power "Preqc" is zero, the electric-power "P1" can be supplied from the battery 143. The electric-power "P1" supplied from the battery 143 is determined so that the total of the electric-power "P1" and the electric-power "P2" agrees with the total required electric-power "Preqa". Thus, in a case that the electric-power is supplied from the battery 143 and the other electric-power sources (k), the total required electric-power "Preqa" can be supplied while the total fuel consumption "f" can be made minimum.

The above electricity-fuel relationship in each electric-power source (i) is computed according to a driving condition of the engine 110. Thus, the electric-power "Pi" supplied from each electric-power source (i) is appropriately allocated according to the current driving condition of the engine 110.

The present invention is not limited to the embodiments described above, but may be performed, for example, in the following manner.

In the above embodiment, a plurality of the electric-power sources except the battery 143 is assumed as one electric-power source to determine the optimal allocation. Alternatively, an optimal allocation of the electric-power can be determined with respect to the EWH-generator 125, the generator 141, and the battery 143.

The number of the electric-power sources can be established arbitrarily.

A PTC heater can be used instead of the heat pump system 130. In this case, since the electric-power supplied to the PTC heater is equal to the heat quantity which the PTC heater can generate, the heat-fuel rate of the PTC can be easily obtained.

The heat supply control and the electric-power supply control can be executed independently. Alternatively, only one of these controls can be executed.

The allocation of heat quantity can be determined by another computation other than the way described above.

The present invention can be applied to a diesel engine.

What is claimed is:

1. A waste heat controller controlling a waste heat quantity of an engine based on a required heat quantity along with a heat-utilize requirement, the waste heat controller comprising:
   an increase rate computing means for computing a fuel-increase-rate in a case that the heat-utilize requirement is generated, the fuel-increase-rate representing a fuel increase quantity relative to a generated waste heat quantity;
   a reference setting means for setting a reference fuel-increase-rate based on which it is determined whether a waste heat increase control should be executed in order to increase an engine waste heat quantity corresponding to the heat-utilize requirement; and
   a waste heat control means for determining whether the waste heat increase control should be executed based on a comparison result between the fuel-increase-rate and the reference fuel-increase-rate.

2. A waste heat controller according to claim 1, wherein the increase rate computing means computes a fuel-increase-rate characteristic representing a relationship between the generated engine waste heat quantity and the fuel-increase-rate at a time of starting an increase in the waste heat quantity, and
   the waste heat control means executes the waste heat increase control along with the fuel-increase-rate characteristic based on the generated engine waste heat quantity corresponding to the fuel-increase-rate at which the fuel increase quantity is decreased relative to the reference fuel-increase-rate.

3. A waste heat controller according to claim 2, wherein the waste heat control means executes the waste heat increase control along with the fuel-increase-rate characteristic based on a command waste heat quantity which generates a maximum heat quantity.

4. A waste heat controller according to claim 1, wherein the reference setting means variably sets the reference fuel-increase-rate based on the required heat quantity.

5. A waste heat controller according to claim 1, wherein the reference setting means variably sets the reference fuel-increase-rate based on the engine coolant temperature.

6. A waste heat controller according to claim 5, further comprising:
   a temperature detecting means for detecting an engine coolant temperature, and
   a target temperature setting means for setting a target engine coolant temperature, wherein
   the reference setting means variably sets the reference fuel-increase-rate based on a difference between the detected engine coolant temperature and the target engine coolant temperature.

7. A waste heat controller according to claim 1, wherein the reference setting means variably sets the reference fuel-increase-rate based on an exterior air temperature.

8. A heat-source controller controlling a heat supply from multiple heat sources to a heat exchange portion mounted to a vehicle, the heat-source controller comprising:
   a required heat quantity computing means for computing a required heat quantity which is required to be supplied from the heat sources to the heat exchange portion;
   a heat-fuel rate computing means for computing a relationship between a supply heat quantity and a heat-fuel rate representing a fuel consumption for generating a unit heat quantity, with respect to each heat source; and
   a heat allocation determining means for determining an allocation of heat quantity which each heat source supplies based on the relationship between the supply heat quantity and the heat-fuel rate in such a manner that the total heat quantity agrees with the required heat quantity and that the heat-fuel rate becomes a minimum value.

9. A heat-source controller according to claim 8, further comprising:
   a heat-fuel computing means for computing a fuel consumption per increased heat with respect to each heat source, wherein
   the heat allocation determining means determines the allocation of heat quantity which each heat source supplies in such a manner that the total heat quantity supplied from the heat sources agrees with the required heat quantity and that the fuel consumption per increased heat of each heat source agrees with each other.

10. A heat-source controller according to claim 9, further comprising:
    a heat-fuel relationship computing means for computing a heat-fuel relationship between the heat quantity and the fuel consumption per increased heat, wherein
    while the heat allocation determining means varies the fuel consumption per increased heat to agree with each other with respect to each heat source, the heat allocation determining means computes a heat quantity corresponding to the fuel consumption per increased heat based on the heat-fuel relationship, and determines the allocation of heat quantity which each heat source supplies in such a manner that the total heat quantity supplied from all heat sources agrees with the required heat quantity.

11. A heat-source controller according to claim 10, wherein
    the heat-fuel relationship computing means sets an upper limit of heat quantity which each heat source can supply, and
    while the heat allocation determining means makes the fuel consumption per increased heat agree with each other in each heat source to be increased, the heat allocation determining means computes a heat quantity corresponding to the fuel consumption per increased heat based on the heat-fuel relationship, and determines the allocation of heat quantity in such a manner that a total of the upper limit heat quantity of a specified heat source and the heat quantity which the other heat sources supply agrees with the required heat quantity.

12. A heat-source controller according to claim 10, wherein
    the heat-fuel relationship computing means computes the heat-fuel relationship with respect to each heat source according to a driving condition of an engine mounted on the vehicle.

13. A heat-source controller according to claim 8, wherein
the multiple heat sources include an engine which supplies a heat quantity to the heat exchange portion through an engine coolant, and
the engine is equipped with an electric water pump which discharges the engine coolant of which quantity is controlled according to a heat quantity supplied from the engine.

14. A heat-source controller according to claim 8, wherein
the multiple heat sources include an electric heat source which generates a heat by converting an electric-power, and
the heat-fuel rate computing means computes the heat-fuel rate based on an electricity-fuel rate which indicates a fuel consumption for generating a unit electric-power.

15. A heat-source controller according to claim 14, wherein
the vehicle is equipped with multiple electric-power sources, further comprising:
a required electric-power computing means for computing a required electric-power which is required to be supplied from the multiple electric-power sources to an electric load including the electric heat source;
a electricity-fuel rate computing means for computing a relationship between an electric-power supplied from each electric-power source and the electricity-fuel rate; and
an electric-power allocation determining means for determining an allocation of electric-power which each electric-power source supplies based on the relationship between supplied electric-power and the electricity-fuel rate in such a manner that the total electric-power agrees with the required electric-power and that the electricity-fuel rate becomes a minimum value, wherein
the electricity-fuel rate computing means computes the heat-fuel rate based on a minimum electricity-fuel rate with respect to the electric heat source.

16. A heat-source controller according to claim 15, further comprising:
an electricity-fuel computing means for computing a fuel consumption per increased electric-power with respect to each electric-power source, wherein
the electric-power allocation determining means determines the allocation of electric-power which each electric-power source supplies in such a manner that the total electric-power supplied from the electric-power sources agrees with the required electric-power and that the fuel consumption per increased electric-power of each electric-power source agrees with each other.

17. A heat-source controller according to claim 16, further comprising:
an electricity-fuel relationship computing means for computing an electricity-fuel relationship between the electric-power and the fuel consumption per increased electric-power, wherein
while the electric-power allocation determining means varies the fuel consumption per increased electric-power to agree with each other with respect to each heat source, the electric-power allocation determining means computes an electric-power corresponding to the fuel consumption per increased electric-power based on the electricity-fuel relationship, and determines the allocation of electric-power which each electric-power source supplies in such a manner that the total electric-power supplied from all electric-power source agrees with the required electric-power.

18. A heat-source controller according to claim 17, wherein
the electricity-fuel relationship computing means sets an upper limit of electric-power which each electric-power source can supply, and
while the electric-power allocation determining means increases the fuel consumption per increased electric-power to agree with each other with respect to each electric-power source, the electric-power allocation determining means computes an electric-power corresponding to the fuel consumption per increased electric-power based on the electricity-fuel relationship, and determines the allocation of electric-power in such a manner that a total of the upper limit of electric-power of a specified electric-power source and the electric-power which the other electric-power sources supply agrees with the required electric-power quantity.

19. A heat-source controller according to claim 17, wherein
the multiple electric-power sources includes a battery,
the electricity-fuel relationship computing means sets the fuel consumption per increased electric-power of the battery to a constant value,
while the electric-power allocation determining means sets the fuel consumption per increased electric-power to a constant value to agree with each other with respect to each electric-power source, the electric-power allocation determining means computes an electric-power corresponding to the fuel consumption per increased electric-power based on the electricity-fuel relationship, and determines the allocation of electric-power which each electric-power source supplies in such a manner that a total of electric-power supplied from the battery and the other electric-power sources agrees with the required electric-power.

20. A heat-source controller according to claim 17, wherein
the electricity-fuel relationship computing means computes the electricity-fuel relationship with respect to each electric-power source according to a driving condition of an engine mounted on the vehicle.

21. A heat-source controller according to claim 14, further comprising:
the vehicle is equipped with multiple electric-power sources including a battery, further comprising:
a load-required electric-power computing means for computing a load-required electric-power which is required to be supplied from the multiple electric-power sources to an electric load including the electric heat source;
a charge-required electric-power computing means for computing a charge-required electric-power which is required to be supplied from the multiple electric-power sources except the battery for charging the battery;
an electricity-fuel rate computing means for computing a relationship between an electric-power supplied from each electric-power source and the electricity-fuel rate; and
an electric-power allocation determining means for determining an allocation of electric-power which each electric-power source except the battery supplies based on the relationship between the supply electric-power and the electricity-fuel rate in such a manner that the total electric-power, which corresponds to a summation of the load-required electric-power and the charge-required electric-power, agrees with a total required electric-power and that the electricity-fuel rate becomes a minimum value, wherein the electricity-fuel rate computing means computes the heat-fuel rate based on a minimum electricity-fuel rate with respect to the electric heat source.

22. A heat-source controller according to claim 21, further comprising:
an electricity-fuel computing means for computing a fuel consumption per increased electric-power with respect to each electric-power source except the battery, wherein
the electric-power allocation determining means determines the allocation of electric-power which each electric-power source except the battery supplies in such a manner that the total electric-power supplied from the electric-power sources except the battery agrees with the total required electric-power and that the fuel consumption per increased electric-power of each electric-power source except the battery agrees with each other.

23. A heat-source controller according to claim 22, further comprising:
an electricity-fuel relationship computing means for computing an electricity-fuel relationship between the electric-power and the fuel consumption per increased electric-power, wherein
while the electric-power allocation determining means varies the fuel consumption per increased electric-power to agree with each other with respect to each electric-power source except the battery, the electric-power allocation determining means computes an electric-power corresponding to the fuel consumption per increased electric-power based on the electricity-fuel relationship, and determines the allocation of electric-power which each electric-power source except the battery supplies in such a manner that the total electric-power supplied from all electric-power sources except the battery agrees with the total required electric-power.

24. A heat-source controller according to claim 23, wherein
the electricity-fuel relationship computing means sets an upper limit of electric-power which each electric-power source can supply, and
while the electric-power allocation determining means varies the fuel consumption per increased electric-power to agree with each other with respect to each electric-power source except the battery, the electric-power allocation determining means computes an electric-power corresponding to the fuel consumption per increased electric-power based on the electricity-fuel relationship with respect to each electric-power source except the battery, and determines the allocation of electric-power except the battery in such a manner that a total of the upper limit of electric-power of a specified electric-power source and the electric-power which the other electric-power sources supply agrees with the total required electric-power.

25. A heat-source controller according to claim 23, further comprising:
a charge-electricity-fuel rate computing means for computing a charge-electricity-fuel rate representing a fuel consumption for charging the battery by a unit charging amount when the electric-power is supplied from the electric-power source except the battery and the battery is charged, wherein
the charge-electricity-fuel rate computing means defines a maximum electric-power in a range where the charge-electricity-fuel rate is less than a reference value as the charge-required electric-power.

26. A heat-source controller according to claim 23, further comprising
an optimal electricity-fuel rate computing means for computing an optimal electricity-fuel rate by dividing the total fuel consumption consumed in each electric-power source except battery by the total required electric-power; wherein
based on the electric-power and the optimal electricity-fuel rate, an electricity-fuel computing means computes a fuel consumption per increased electric-power with respect to each electric-power source except the battery,
the electricity-fuel relationship computing means computes the electricity-fuel relationship and sets the fuel consumption per increased electric-power to a constant value, and
while the electric-power allocation determining means sets the fuel consumption per increased electric-power to a constant value in a case that the charge required electric-power is zero, the electric-power allocation determining means computes an electric-power corresponding to the fuel consumption per increased electric-power based on the electricity-fuel relationship, and determines the electric-power which the battery supplies in such a manner that a total of electric-power supplied from the battery and the other electric-power sources agrees with the total required electric-power.

27. An electric-power-source controller controlling an electric-power supply from multiple electric-power sources to an electric load mounted to a vehicle, the electric-power-source controller comprising:
a required electric power computing means for computing a required electric power which is required to be supplied from the multiple electric-power sources to the electric load;
an electricity-fuel computing means for computing a fuel consumption per increased electric-power with respect to each electric power source, and
an electric-power allocation determining means for determining an allocation of electric-power which each electric-power source supplies in such a manner that the total electric-power agrees with the required electric-power and that the fuel consumption per increased electric-power of each electric-power source agrees with each other.

28. An electric-power-source controller according to claim 27, further comprising:
an electricity-fuel relationship computing means for computing an electricity-fuel relationship between the electric-power and the fuel consumption per increased electric-power, wherein
while the electric-power allocation determining means varies the fuel consumption per increased electric power to agree with each other with respect to each electric-power source, the electric-power allocation determining means computes an electric-power corresponding to the fuel consumption per increased electric-power based on the electricity-fuel relationship, and determines the allocation of electric-power which each electric-power source supplies in such a manner that the total electric-power supplied from all electric-power sources agrees with the required electric-power.

29. An electric-power-source controller according to claim 28, wherein
the electricity-fuel relationship computing means sets an upper limit of electric-power which each electric-power source can supply, and while the electric-power allocation determining means increases the fuel consumption per increased electric-power to agree with each other with respect to each electric-power source, the electric-power allocation determining means computes an electric-power corresponding to the fuel consumption per increased electric-power based on the electricity-fuel relationship, and determines the allocation of electric-power in such a manner that a total of the upper limit electric-power of a specified electric-power source and the electric-power which the other electric-power sources supply agrees with the required electric-power.

30. An electric-power-source controller according to claim 28, wherein
the multiple electric-power sources include a battery,
the electricity-fuel relationship computing means sets the fuel consumption per increased electric power of the battery to a constant value,
while the electric-power allocation determining means sets the fuel consumption per increased electric-power to a constant value to agree with each other with respect to each electric-power source, the electric-power allocation determining means computes an electric-power corresponding to the fuel consumption per increased electric-power based on the electricity-fuel relationship, and determines the allocation of electric-power which each electric-power source supplies in such a manner that a total of electric-power supplied from the battery and the other electric-power source agrees with the required electric-power.

31. An electric-power-source controller according to claim 28, wherein
the electricity-fuel relationship computing means computes the electricity-fuel relationship with respect to each electric-power source according to a driving condition of an engine mounted on the vehicle.

32. An electric-power-source controller controlling an electric-power supply from multiple electric-power sources including a battery to an electric load mounted to a vehicle, the electric-power-source controller comprising:
a load-required electric-power computing means for computing a load-required electric power which is required to be supplied to the electric load;
a charge-required electric-power computing means for computing a charge-required electric-power which is required to be supplied from the multiple electric power sources except the battery for charging the battery;
an electricity-fuel computing means for computing a fuel consumption per increased electric power with respect to each electric-power source except the battery, wherein
an electric-power allocation determining means determines the allocation of electric-power which each electric power source except the battery supplies in such a manner that a total electric-power supplied from the electric-power sources except the battery agrees with the total required electric power and that the fuel consumption per increased electric power of each electric power source except the battery agrees with each other.

33. An electric-power-source controller according to claim 32, further comprising:
an electricity-fuel relationship computing means for computing an electricity-fuel relationship between the electric-power and the fuel consumption per increased electric-power, wherein
while the electric-power allocation determining means varies the fuel consumption per increased electric power to agree with each other with respect to each electric-power source except the battery, the electric-power allocation determining means computes an electric power corresponding to the fuel consumption per increased electric power based on the electricity-fuel relationship, and determines the allocation of electric power which each electric power source except the battery supplies in such a manner that the total electric power supplied from all electric power source except the battery agrees with the total required electric power.

34. An electric-power-source controller according to claim 33, wherein
the electricity-fuel relationship computing means sets an upper limit of electric power which each electric power source can supply, and
while the electric-power allocation determining means increases the fuel consumption per increased electric-power to agree with each other with respect to each electric-power source except the battery, the electric-power allocation determining means computes an electric-power corresponding to the fuel consumption per increased electric-power based on the electricity-fuel relationship with respect to each electric-power source except the battery, and determines the allocation of electric-power except the battery in such a manner that a total of the upper limit electric-power of a specified electric-power source and the electric power which the other electric-power sources supply agrees with the total required electric-power.

35. An electric-power-source controller according to claim 33, further comprising:
a charge-electricity-fuel rate computing means for computing a charge-electricity-fuel rate representing a fuel consumption for charging the battery by a unit charging amount when the required electric-power is supplied from the electric-power source except the battery and the battery is charged, wherein
the charge-electricity-fuel rate computing means defines a maximum electric-power, in a range where the charge-electricity-fuel rate is less than a reference value, as a charge-required electric-power.

36. An electric-power-source controller according to claim 33, further comprising:
an optimal electricity-fuel rate computing means for computing an optimal electricity-fuel rate by dividing the total fuel consumption consumed in each electric-power source except battery by the total required electric power; wherein
based on the electric-power and the optimal electricity-fuel rate, an electricity-fuel computing means computes a fuel consumption per increased electric power with respect to each electric power source except the battery,
the electricity-fuel relationship computing means computes the electricity-fuel relationship and sets the fuel consumption per increased electric power to a constant value, and
while the electric-power allocation determining means sets the fuel consumption per increased electric power to a constant value in a case that the charge required electric power is zero, the electric-power allocation determining means computes an electric power corresponding to the fuel consumption per increased electric power based on the electricity-fuel relationship, and determines the electric power which the battery supplies in such a manner that a total of electric power supplied from the battery and the other electric power sources agrees with the total required electric power.

* * * * *